(12) United States Patent
Patil et al.

(10) Patent No.: US 9,402,261 B2
(45) Date of Patent: Jul. 26, 2016

(54) METHODS AND APPARATUS FOR COMMUNICATING UPLINK DATA SIGNALS SIMULTANEOUSLY WITH DEVICE TO DEVICE DATA SIGNALS

(75) Inventors: Shailesh Patil, Bridgewater, NJ (US); Hua Wang, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 13/585,340

(22) Filed: Aug. 14, 2012

(65) Prior Publication Data

US 2014/0051470 A1  Feb. 20, 2014

(51) Int. Cl.
| | | |
|---|---|---|
| H04B 5/00 | (2006.01) |
| H04W 72/04 | (2009.01) |
| H04W 76/02 | (2009.01) |
| H04W 88/02 | (2009.01) |
| H04B 7/04 | (2006.01) |

(52) U.S. Cl.
CPC .......... *H04W 72/048* (2013.01); *H04W 76/025* (2013.01); *H04B 7/0452* (2013.01); *H04W 76/023* (2013.01); *H04W 88/02* (2013.01)

(58) Field of Classification Search
CPC .................................................. H04W 72/048
USPC .................................. 455/41.1, 423; 340/329
See application file for complete search history.

(56) References Cited

U.S. PATENT DOCUMENTS

| | | |
|---|---|---|
| 2008/0069033 A1 | 3/2008 | Li et al. |
| 2009/0116444 A1 | 5/2009 | Wang et al. |
| 2010/0261469 A1 | 10/2010 | Ribeiro et al. |
| 2011/0117907 A1 | 5/2011 | Hooli et al. |
| 2011/0159799 A1 | 6/2011 | Chen et al. |
| 2011/0170425 A1* | 7/2011 | Horiuchi ................. H04B 7/026 370/242 |
| 2011/0228730 A1 | 9/2011 | Abraham et al. |
| 2011/0237289 A1 | 9/2011 | Fodor et al. |
| 2011/0243010 A1 | 10/2011 | Geirhofer et al. |
| 2011/0255450 A1 | 10/2011 | Wang et al. |
| 2011/0282989 A1 | 11/2011 | Geirhofer et al. |

FOREIGN PATENT DOCUMENTS

| | | |
|---|---|---|
| WO | WO2010102668 A1 | 9/2010 |
| WO | 2012048464 A1 | 4/2012 |

OTHER PUBLICATIONS

International Search Report and Written Opinion—PCT/US2013/054728—ISA/EPO—Feb. 3, 2014.

* cited by examiner

*Primary Examiner* — Hsin-Chun Liao
(74) *Attorney, Agent, or Firm* — Nerrie M. Zohn

(57) ABSTRACT

A wireless communications device, e.g., a mobile wireless terminal, is controlled by a base station to simultaneously: (i) transmit uplink data signals in an uplink spectrum to a base station and (ii) transmit device to device data signals in the uplink spectrum to another wireless communications device. In various embodiments, the uplink data signals are communicated in a first multi-antenna stream corresponding to a first multi-antenna configuration and the device to device data signals are communicated in a second multi-antenna stream corresponding to a second multi-antenna configuration. Control information communicated from the base station to the wireless communications device being controlled include, e.g., a selected first antenna configuration for uplink data signaling, a selected second antenna configuration for device to device data signaling, a selected first maximum transmission power level for uplink data signaling and a selected second maximum transmission power level for device to device data signaling.

4 Claims, 14 Drawing Sheets

METHODS AND APPARATUS FOR COMMUNICATING UPLINK DATA SIGNALS SIMULTANEOUSLY WITH DEVICE TO DEVICE DATA SIGNALS

FIELD

Various embodiments are directed to wireless communications including both wide area network (WAN) communications and device to device communications, and more particularly to scheduling, controlling, and/or implementing simultaneous uplink data transmission signaling and device to device data transmission signaling by a wireless communications device, e.g., a mobile wireless terminal, under the control of a base station.

BACKGROUND

In WAN, all communications between mobiles go through the uplink/downlink channels between mobiles and base stations. In the case that two communicating mobiles are in the vicinity of each other, using direct device to device communication instead of using uplink/downlink channels can enable new services and reduce the load of base station.

While device to device communication offers potential of increasing system capacity by allowing at least some communications to occur without going through an infrastructure element such as a base station, interference management is of concern since the base station may not have control over interference generated by device to device communication. Furthermore, if communications resources are dedicated to device to device communications, an increase in overall system capacity might not be achieved since the device to device communications resources come at the expense of the resources which remain available for infrastructure communications, e.g., wireless terminal to base station communications.

In view of the above discussion it should be appreciated that there is a need for methods and apparatus which allow for at least some communications resources to be used simultaneously for both infrastructure and device to device communications. While not a necessity, it is desirable that at least in some embodiments a base station or other infrastructure element can have some control over at least some simultaneous device to device and device to infrastructure element, e.g., device to base station, communications so that the base station can control and/or limit interference in the system.

SUMMARY

Some embodiments are directed to methods and apparatus for operating a wireless communications device, e.g., a mobile wireless terminal, to simultaneously: (i) transmit uplink data signals in an uplink spectrum to a base station and (ii) transmit device to device data signals in the uplink spectrum to another wireless communications device. Some embodiments are directed to methods and apparatus for operating a base station to control a wireless communications device, e.g., a mobile wireless terminal, to simultaneously: (i) transmit uplink data signals in an uplink spectrum to the base station and ii) transmit device to device data signals in the uplink spectrum to another wireless communications device. In various embodiments, the uplink data signals are communicated in a first multi-antenna stream corresponding to a first multi-antenna configuration and the device to device data signals are communicated in a second multi-antenna stream corresponding to a second multi-antenna configuration. In various embodiments the base station decides which wireless communications device is to simultaneously transmit uplink data signals and device to device data signals, e.g., based on estimated channel conditions and/or interference. In some such embodiments, the base stations controls a wireless communications device's simultaneous uplink and device to device transmissions, e.g., selecting an antenna configuration to be used by the wireless communications device for uplink data signaling, selecting an antenna configuration to be used for the wireless communications device for device to device data signaling, selecting a maximum transmission power level that the wireless communications device is allowed to use for uplink data signaling and selecting a maximum transmission power level that the wireless communications device is allowed to use for device to device data signaling. In some embodiments, device to device data signals are communicated directly between two wireless communications devices, however, the corresponding acknowledgment signal is communicated via a base station serving as an intermediary.

An exemplary method of operating a first wireless communication device, in accordance with some embodiments, comprises: receiving a signal including an instruction instructing the first wireless communications device to simultaneously i) transmit uplink data to a base station and ii) transmit device to device data which is different from said uplink data to a second wireless communications device. The exemplary method further comprises: transmitting, in accordance with said instruction, said uplink data on the uplink spectrum in a first multi-antenna stream corresponding to a first multi-antenna configuration; and transmitting, simultaneously with said uplink data, in accordance with said instruction, said device to device data on the uplink spectrum in a second multi-antenna stream corresponding to a second multi-antenna configuration, said uplink data being different from said device to device data. An exemplary first wireless communications device, in accordance with some embodiments, comprising: at least one processor configured to: receive a signal including an instruction instructing the first wireless communications device to simultaneously i) transmit uplink data to a base station and ii) transmit device to device data which is different from said uplink data to a second wireless communications device; transmit, in accordance with said instruction, said uplink data on the uplink spectrum in a first multi-antenna stream corresponding to a first multi-antenna configuration; and transmit, simultaneously with said uplink data, in accordance with said instruction, said device to device data on the uplink spectrum in a second multi-antenna stream corresponding to a second multi-antenna configuration, said uplink data being different from said device to device data. The exemplary first wireless communications device further comprises memory coupled to said at least one processor.

An exemplary method of operating a base station, in accordance with some embodiments, comprises: generating a signal including an instruction instructing a first wireless communications device to simultaneously i) transmit uplink data to the base station and ii) transmit device to device data, which is different from said uplink data, to a second wireless communications device; transmitting said generated signal including an instruction; and receiving said uplink data on the uplink spectrum which was transmitted in a first multi-antenna stream corresponding to a first multi-antenna configuration by the first wireless communications device in response to said transmitted signal including an instruction. An exemplary base station, in accordance with some embodiments, comprises at least one processor configured to generate a signal including an instruction instructing a first wireless communications device to simultaneously i) transmit uplink data to the base station and ii) transmit device to device data, which is different from said uplink data, to a second wireless communications device; transmit said generated signal including an instruction; and receive said uplink data on the uplink spectrum which was transmitted in a first multi-antenna stream corresponding to a first multi-antenna configuration by the first wireless communications device in response to said transmitted signal including an instruction. The exemplary base station further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
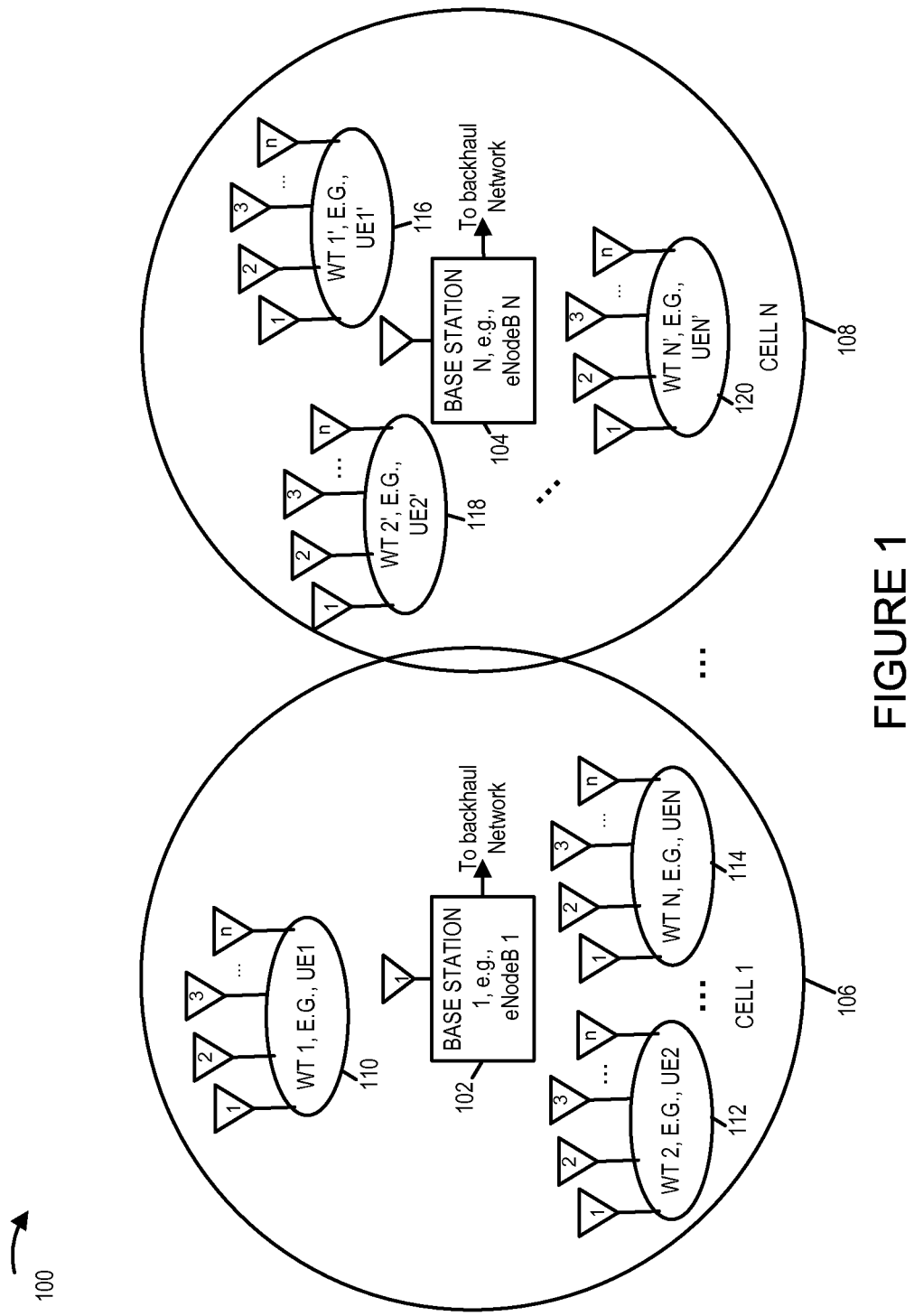
FIG. 1 is a drawing of an exemplary communications system in accordance with various exemplary embodiments.

FIG. 1 is a drawing of an exemplary communications system 100 in accordance with various embodiments. Exemplary communications system 100 includes a plurality of base stations (base station 1 102, . . . , base station N 104). Each base station has a corresponding wireless coverage area (cell 1 106, . . . , cell N 108). In some embodiments, the base stations are eNodeB devices. Exemplary communications system 100 also includes a plurality of multi-antenna wireless communications devices, e.g., wireless terminals. In this example, wireless communications devices (WT 1 110, WT 2 112, . . . , WT N 114) are currently located within cell 1 106. Wireless communications devices (WT 1' 116, WT 2' 118, . . . , WT N' 120) are currently located within cell N 108. The wireless communications devices are e.g., mobile wireless communications devices such as mobile wireless terminals which may move throughout system 100. In some embodiments, the wireless communications devices are user equipment (UE) devices. The wireless communications devices include a plurality of antennas. A wireless communications device, e.g., WT 1 110, may, and sometimes does transmit uplink data to a base station, e.g., BS 1 102, in the uplink spectrum in a first multi-antenna stream corresponding to a first multi-antenna configuration and simultaneously transmit device to device data to another wireless communications device, e.g., WT 2 112, in the uplink spectrum in a second multi-antenna stream corresponding to a second multi-antenna configuration.

In some embodiments, a base station, e.g., BS 1 102, decides for a wireless communications device, e.g. WT 1 110 whether or not uplink data communications to the BS and direct device to device data, e.g., from WT 1 110 to WT 2 112, are to occur simultaneously using multi-antenna streams, e.g., based on estimated channels conditions and/or estimated interference. In various embodiments, a base station, e.g., BS 1 102, transmits an instruction signal or signals to a wireless communications device, e.g., WT 1 110, to control the simultaneous data transmissions including uplink transmission and device to device transmission. In some embodiments, an instruction signal from a base station, e.g., BS 1 102, to a wireless communications device, e.g., WT 1 110, communications one or more or all of: a first set of antenna weight information corresponding to a first antenna configuration to be used for data transmission to the base station, a second set of antenna weight information corresponding to a second antenna configuration to be used for device to device data transmissions, a first maximum transmission power level applicable for data transmission to the base station and a second maximum transmission power level applicable for device to device data transmissions. A base station, e.g., BS 1 102, can and sometimes does, control multiple wireless communications devices within its cell with regard to simultaneous transmission to the base station and to another wireless communications device using different multi-antenna streams corresponding to different multi-antenna configurations.

In some embodiments, a base station, e.g., BS 1 102, serves an intermediary for forwarding acknowledgement signals corresponding to direct device to device data communications between two wireless communications devices, e.g., WT 2 112 and WT 1 110.

Figure 2:
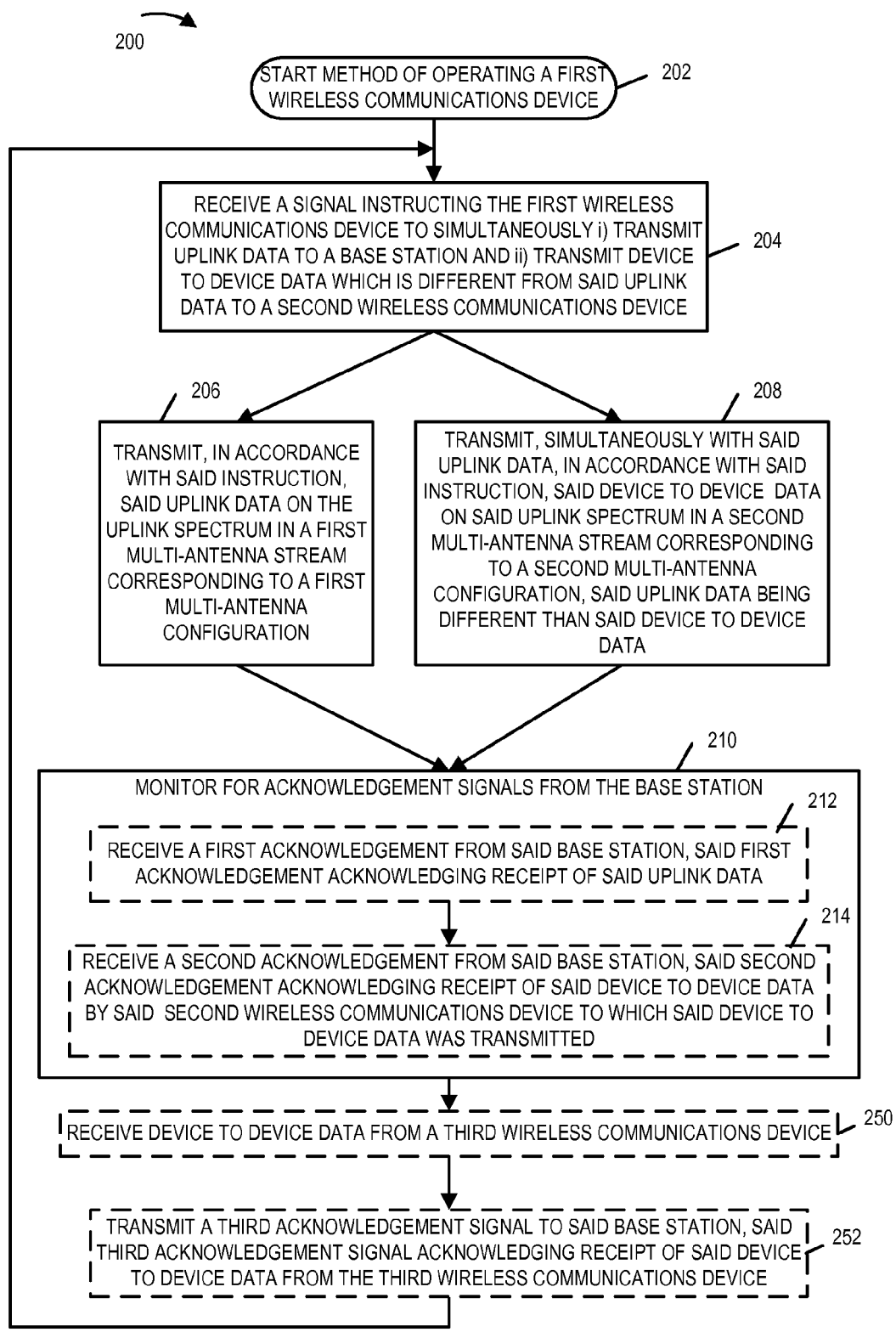
FIG. 2 is a flowchart of an exemplary method of operating a first wireless communications device, e.g., a user equipment device such as a mobile wireless terminal, in accordance with an exemplary embodiment.

FIG. 2 is a flowchart 200 of an exemplary method of operating a first wireless communications device, e.g., a user equipment device such as a mobile wireless terminal, in accordance with an exemplary embodiment. Operation starts in step 202 where the first wireless communications device is powered on an initialized. Operation proceeds from start step 202 to step 204, in which the first wireless communications device receives a signal instructing the first wireless communications device to simultaneously i) transmit uplink data to a base station, e.g., an infrastructure element such as an eNodeB and ii) transmit device to device data, which is different from said uplink data, to a second wireless communications device.

In some embodiments, the signal further includes information indicating a maximum power that can be used for transmitting said device to device data. In some such embodiments, the signal further includes information indicating a maximum power that can be used for transmitting said uplink data to the base station. In various embodiments, the signal is received from a base station in a control channel, e.g., a channel used to allocate uplink channel resources.

In some embodiments the signal provides antenna configuration information. In some such embodiments the antenna configuration information includes information indicating a first multi-antenna configuration to be used for uplink data and a second multi-antenna configuration to be used for device to device data.

In various embodiments, the first wireless communications devices recovers one or more or all of: information indicating a maximum power that can be used for transmitting uplink data to the base station, information indicating a maximum power that can be used for transmitting device to device data, a first set of antenna weights corresponding to a first multi-antenna configuration, and a second set of antenna weights corresponding to a second multi-antenna configuration from the received signal instructing the first wireless terminal which was received in step 204.

Operation proceeds from step 204 to steps 206 and 208 which are performed in parallel. In step 206 the first wireless communications device transmits, in accordance with said instruction, said uplink data on the uplink spectrum in a first multi-antenna stream corresponding to a first multi-antenna configuration. In some embodiments, the first multi-antenna stream is formed in the channel form transmission from a first set of multiple antennas. In some embodiments, the wireless communications device uses a first set of antenna weights corresponding to said first multi-antenna configuration when transmitting uplink signals using a first set of antennas. In some embodiments, the uplink data transmission power level is controlled in accordance with a recovered indicated maximum power level for transmitting uplink data to the base station, which was recovered from the signal received in step 204.

In step 208 the first wireless communications device transmits, simultaneously with said uplink data, in accordance with said instruction, said device to device data on said uplink spectrum in a second multi-antenna stream corresponding to a second multi-antenna configuration, said uplink data being different from said device to device data. In some embodiments, the second multi-antenna stream is formed in the channel from transmission from a second set of multiple antennas. In some embodiments, the wireless communications device uses a second set of antenna weights corresponding to said second multi-antenna configuration when transmitting device to device data using a second set of antennas, said first and second sets of antenna weights being different. In some embodiments, the device to device data transmission power level is controlled in accordance with a recovered indicated maximum power level for transmitting device to device data, which was recovered from the signal received in step 204.

In some embodiments, the uplink data transmitted to the base station may, and sometimes does, include different user data than the user data transmitted as part of the device to device data and the uplink data is intended for a different end node than the device to device data. For example, the transmitted device to device data is intended for the second wireless communications device and the uplink data is intended for a third wireless communications device.

Operation proceeds from step 206 and 208 to step 210. In step 210 the first wireless communications device monitors for acknowledgement signals from the base station. Step 210 may, and sometimes does include one or more of steps 212 and 214. In step 212 the first wireless communications device receives a first acknowledgement from said base station, said first acknowledgement acknowledging receipt of said uplink data. In step 214 the first wireless communications device receives a second acknowledgement from said base station, said second acknowledgement acknowledging receipt of said device to device by said second wireless communications device to which said device to device data was transmitted. In some embodiments the second acknowledgement is received in a downlink transmission resource having a predetermined timing offset from a transmission resource used to transmit said device to device data to the second wireless communications device. In various embodiments, the second acknowledgement follows receipt by the base station of an acknowledgement signal from the second communications device to the base station over an uplink channel.

In some embodiments, operation proceeds from step 210 to step 204. In some embodiments, operation may, and sometimes does proceed from step 210 to step 250. In step 250 the first wireless communications device receives device to device data from a third wireless communications device. In some such embodiments, the received device to device data was transmitted by the third wireless communications device on the uplink using a third multi-antenna configuration simultaneously with transmission by the third wireless communications device of uplink data to said base station using a fourth multi-antenna configuration. Operation proceeds from step 250 to step 252 in which the first wireless communications device transmits a third acknowledgement signal to said base station, said third acknowledgement signal acknowledging receipt of said device to device data from the third wireless communications device. In various embodiments, the third acknowledgement signal is intended to be communicated to the third wireless communications device via the base station. In some such embodiments, the third acknowledgement signal includes information identifying the third wireless communications device. In some embodiments, the linkage of the third acknowledgement signal to the third wireless communications device is implicitly communicated via the location of corresponding air link resources in the timing structure. In some embodiments, there is a predetermined relationship in a recurring timing frequency resource structure of the uplink between the air link resource used to communicate the device to device data transmitted by the third wireless communications device to the first wireless communications device and the air link resource used to communicate the third acknowledgement signal to the base station. Operation proceeds from step 252 to step 204.

Figure 3:
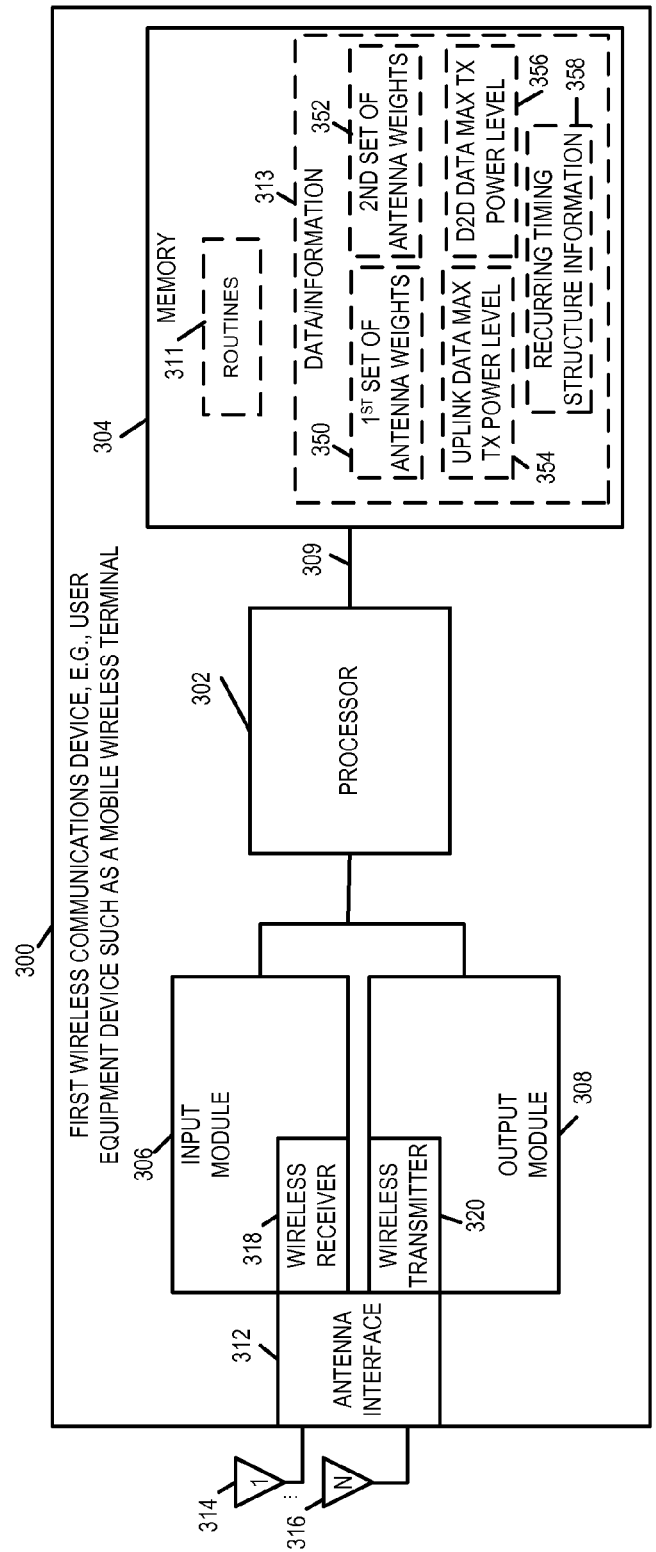
FIG. 3 is a drawing of an exemplary first wireless communications device, e.g., a user equipment device such as a mobile wireless terminal, in accordance with an exemplary embodiment.

FIG. 3 is a drawing of an exemplary first wireless communications device 300, e.g., a user equipment device such as a mobile wireless terminal, in accordance with an exemplary embodiment. Exemplary first wireless communications device 300 is, e.g., one of the mobile wireless terminals of system 100 of FIG. 1. First wireless communications device 300 may, and sometimes does, implement a method in accordance with flowchart 200 of FIG. 2.

First wireless communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 includes a wireless receiver 318 for receiving input. In some embodiments, input module 306 further includes a wired or optical input interface for receiving input. Output module 308 includes a wireless transmitter 320 for transmitting output. In some embodiments, output module further includes a wired or optical output interface for transmitting output. First wireless communication device 300 further includes antenna interface 312 for coupling a plurality of antennas (antenna 1 314, . . . , antenna N 316 to the wireless receiver 318 and wireless transmitter 320. In some embodiments, memory 304 includes routines 311 and data/information 313.

In some embodiments, data/information 313 includes one or more or all of: a $1^{st}$ set of antenna weights 350, e.g., to be used when transmitted uplink data to a base station, a second set of antenna weights 352, e.g., to be used when transmitting device to device data to a second wireless communications device, an uplink data maximum transmission power level 354, e.g., to be used to control transmission of uplink data to a base station, a device to device maximum transmission power level 356, e.g., to be used to control transmission of device to device data to the second wireless communications device, and recurring timing structure information 358, e.g., including information identifying uplink and downlink resources, information identifying a channel used to allocate uplink channel resources, information identifying a downlink transmission resource for a second acknowledgement having a predetermined timing offset from a transmission resource used to transmit device to device data to a second wireless communications device.

In various embodiments, processor 302 is configured to receive a signal including an instruction instructing the first wireless communications device to simultaneously i) transmit uplink data to a base station, e.g., an infrastructure element such as an eNodeB, and ii) transmit device to device data which is different from said uplink data to a second wireless communications device. In some such embodiments, processor 302 is further configured to transmit, in accordance with said instruction, said uplink data on the uplink spectrum in a first multi-antenna stream corresponding to a first multi-antenna configuration; and transmit, simultaneously with said uplink data, in accordance with said instruction, said device to device data on the uplink spectrum in a second multi-antenna stream corresponding to a second multi-antenna configuration, said uplink data being different from said device to device data. For example, the data transmitted to the base station includes different user data than the user data transmitted as part of the device to device data and is intended for a different end node than the device to device data.

In some embodiments, the received signal further includes: information indicating a maximum power that can be used for transmitting said device to device data. In some such embodiments, processor 302 is further configured to recover the information indicating a maximum power that can be used for transmitting device to device data from the received signal and control a device to device data transmission based on the recovered indicated maximum power for transmitting device to device data.

In some embodiments, the received signal further includes: information indicating a maximum power that can be used for transmitting said uplink data to said base station. In some such embodiments, processor 302 is further configured to recover the information indicating a maximum power that can be used for transmitting uplink data to said base station from the received signal and control an uplink data transmission to said base station based on the recovered indicated maximum power for transmitting uplink data to said base station.

In some embodiments said signal is received from said base station in a control channel, e.g., a channel used to allocate uplink channel resources.

In various embodiments, processor 302 is further configured to: receive a first acknowledgement from said base station, said first acknowledgement acknowledging receipt of said uplink data; and receive a second acknowledgement from said base station, said second acknowledgement acknowledging receipt of said device to device data by said second wireless communications device to which said device to device data was transmitted. In some such embodiments, said second acknowledgement is received in a downlink transmission resource having a predetermined timing offset from a transmission resource used to transmit said device to device data to the second wireless communications device. In some such embodiments, said second acknowledgement follows receipt by the base station of an acknowledgement signal from said second wireless communications device communicated to the base station over an uplink channel.

In some embodiments, the received said signal provides antenna configuration information. In some such embodiments, said antenna configuration information includes information indicating said first multi-antenna configuration to be used for uplink data and said second multi-antenna configuration to be used for device to device data. In various embodiments, processor 302 is further configured to recover antenna configuration information from the received signal. In various embodiments, processor 302 is configured to recover a first set of antenna weights corresponding to said first multi-antenna configuration, and configured to recover a second set to antenna weights corresponding to said second multi-antenna configuration, as part of being configured to recover antenna configuration information.

In some embodiments, said first wireless communications device uses a first set of antenna weights corresponding to said first multi-antenna configuration when transmitting uplink signals using a first set of antennas and said first wireless communications device uses a second set of antenna weights corresponding to said second multi-antenna configuration when transmitting device to device data using a second set of antennas, said first and second sets of antenna weights being different. In some such embodiments, processor 302 is configured to use a first set of antenna weights corresponding to said first multi-antenna configuration when transmitting uplink signals using a first set of antennas, as part of being configured to transmit in accordance with said instruction, said uplink data. In some embodiments, processor 302 is configured to use a second set of antenna weights corresponding to said second multi-antenna configuration when transmitting uplink signals using a second set of antennas, as part of being configured to transmit in accordance with said instruction, said device to device data.

In some embodiments, processor 302 is configured to receive device to device data from a third wireless communications device. In some such embodiments, processor 302 is further configured to transmit a third acknowledgement signal to said base station, said third acknowledgement signal acknowledging receipt of said device to device data from the third wireless communications device.

Figure 4:
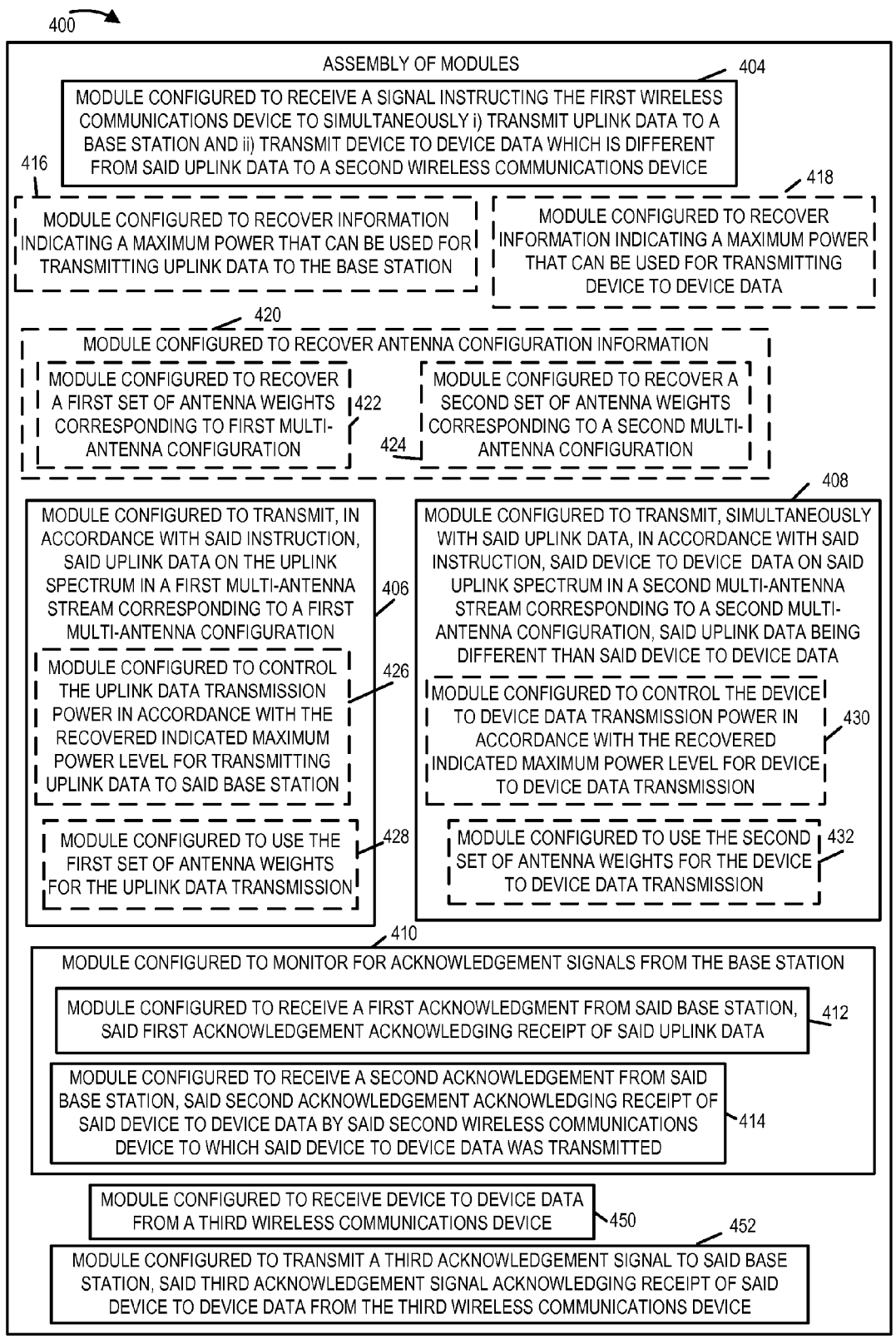
FIG. 4 is an assembly of modules which can, and in some embodiments is, used in the exemplary first wireless communications device illustrated in FIG. 3.

FIG. 4 is an assembly of modules 400 which can, and in some embodiments is, used in the exemplary first wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of first wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the first wireless communications device 300 or elements therein such as the processor 302, to perform the functions of the corresponding steps illustrated and/or described in the method of flowchart 200 of FIG. 2.

FIG. 4 is an assembly of modules 400 in accordance with various embodiments. Assembly of modules 400 includes a module 404 configured to receive a signal instructing the first wireless communications device to simultaneously i) transmit uplink data to a base station and ii) transmit device to device data which is different from said uplink data to a second wireless communications device, a module 406 configured to transmit, in accordance with said instruction, said uplink data on the uplink spectrum in a first multi-antenna stream corresponding to a first multi-antenna configuration, and a module 408 configured to transmit, simultaneously with said uplink data, in accordance with said instruction, said device to device data on said uplink spectrum in a second multi-antenna stream corresponding to a second multi-antenna configuration, said uplink data being different than said device to device data. Assembly of modules 400 further includes a module 410 configured to monitor for acknowledgement signals from the base station. Module 410 includes a module 412 configured to receive a first acknowledgement from said base station, said first acknowledgement acknowledging receipt of said uplink data and a module 414 configured to receive a second acknowledgement from said base station, said second acknowledgement acknowledging receipt of said device to device data by said second wireless communications device to which said device to device data was transmitted.

In some embodiments, said signal received by module 404 further includes: information indicating a maximum power that can be used for transmitting said device to device data. In some such embodiments, said signal received by module 404 further includes: information indicating a maximum power that can be used for transmitting said uplink data to said base station. In some embodiments, assembly of modules 400 includes one or both of: a module 416 configured to recover information indicating a maximum power that can be used for transmitting uplink data to the base station, and a module 418 configured to recover information indicating a maximum power than can be used for transmitting device to device data. Thus, in some embodiments, module 416 and module 418 recover transmission power level control information from the signal received by module 404.

In some embodiments, the signal instructing the first wireless communications device received by module 404 provides antenna configuration information. In some such embodiments assembly of modules 400 includes a module 420 configured to recover antenna configuration information. In some embodiments, said antenna configuration information includes information indicating said first multi-antenna configuration to be used for uplink data and said second multi-antenna configuration to be used for device to device data. In some such embodiments assembly module 420 includes a module 422 configured to recover a first set of antenna weights corresponding to a first multi-antenna configuration and a module 424 configured to recover a second set of weights corresponding to a second multi-antenna configuration.

In some embodiments, the signal instructing the first wireless communications device received by module 404 is received from said base station in a control channel, e.g., a control channel used to allocate uplink channel resources.

In some embodiments, the first wireless communications device uses a first set of antenna weights corresponding to said first multi-antenna configuration when transmitting uplink signals using a first set of antennas; and the first wireless communications device uses a second set of antenna weights corresponding to said second multi-antenna configuration when transmitting device to device data using a second set of antennas. In various embodiments, said first and second sets of antenna weights being different.

In some embodiments, module 406 includes one or more of a module 426 configured to control the uplink data transmission power in accordance with the recovered indicated maximum power level for transmitting uplink data to the base station and a module 428 configured to use the first set of antenna weights for the uplink data transmission. In various embodiments, module 408 includes one or more of a module 430 configured to control the device to device data transmission power in accordance with the recovered indicated maximum power level for device to device data transmission, and a module 432 configured to use the second set of antenna weights for the device to device data transmission. Thus, in a least some embodiments, a maximum power level recovered by module 416 and a first set of antenna weights recovered by module 422 are used to control transmission of uplink data to a base station by module 406; and a maximum power level recovered by module 418 and a second set of antenna weights recovered by module 424 are used to control transmission of device to device data by module 408.

In some embodiments, said second acknowledgement is received in a downlink transmission resource having a predetermined timing offset from a transmission resource used to transmit said device to device data to the second wireless communications device. In some such embodiments, second acknowledgement follows receipt by the base station of an acknowledgement signal from said second wireless communications device communicated to the base station over an uplink channel.

Assembly of modules 400 further includes a module 450 configured to receive device to device data from a third wireless communications device, and a module 452 configured to transmit a third acknowledgement signal to said base station, said third acknowledgement signal acknowledging receipt of said device to device data from the third wireless communications device.

Figure 5:
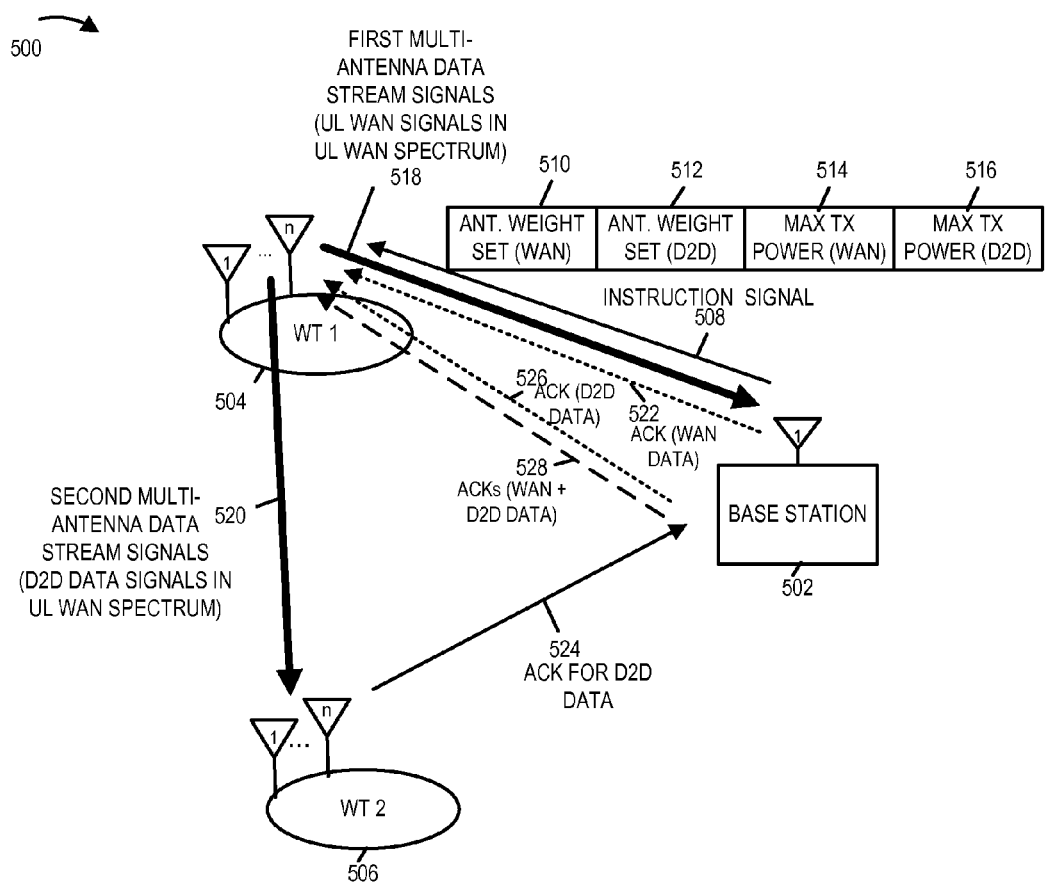
FIG. 5 illustrates an example of operating exemplary wireless communications devices and an exemplary base station in accordance with various exemplary embodiments.

Drawing 500 of FIG. 5 illustrates an example of operating exemplary wireless communications devices (WT 1 504, WT 2 506) and an exemplary base station 502 in accordance with various exemplary embodiments. Based on estimated wireless communications channels and estimated interference, base station 502 decides that WT 1 504 can simultaneously: (i) transmit uplink data to the base station 502 on the uplink spectrum in a first multi-antenna stream corresponding to a first multi-antenna configuration and (ii) transmit device to device data on said uplink spectrum in a second multi-antenna stream corresponding to a second multi-antenna configuration to WT 2 506. BS 502 generates instruction signal 508 instructing WT 1 504 to: simultaneously transmit uplink data to the base station and transmit device to device data which is different from said uplink data to WT 2 506. Instruction signal 508 is communicated in a control channel, e.g., a control channel used to allocate uplink channel resources. Instruction signal 508 includes: antenna weight set information 510 to be used for configuring WT 1 504 with regard the uplink data WAN signaling from WT 1 504 to BS 502; antenna weight set information 512 to be used for configuring WT 1 504 with regard to the device to device data signaling from WT 1 504 to WT 2 506; a maximum transmission power value 514 to be used for controlling WT 1 maximum transmission power with regard to the uplink data signaling to BS 502; and a maximum transmission power value 516 to be used for controlling WT 1 maximum transmission power with regard to device to device data signaling from WT 1 504 to WT 2 506. BS 502 transmits generated signal 508 to WT 1 504.

WT 1 504 receives signal 508 and recovers the information communicated in the signal. WT 1 504 recognizes that it is being instructed to simultaneously transmit uplink data to BS 502 on the uplink spectrum and transmit device to device data to WT 2 506 on the uplink spectrum, in accordance with the information, e.g., antenna configuration control information and transmission power control information, communicated in signal 508. WT 1 504 generates and transmits first multi-antenna data stream signals 518, which are UL WAN signals in the UL WAN spectrum, in accordance with antenna weight information 510 and max transmission power information 516. WT 1 504 generates and transmits second multi-antenna data stream signal 520, which are device to device data signals in the UL WAN spectrum, in accordance with antenna weight information 512 and max transmission power information 516. Signals 518 and 520 are transmitted simultaneously.

Base station 502 receives signals 518; and WT 2 506 receives signals 520. In a first exemplary embodiment, BS 502 generates and transmits WAN data acknowledgement signal 522, directed to WT 1 504, in response to received signal 518. WT 2 506 generates and transmits device to device data acknowledgement signal 524 directed to BS 502, in response to received signal 520. Continuing with the first exemplary embodiments, BS 502 receives device to device acknowledgement signal 524 and generates device to device data acknowledgement signal 526, which the BS 502 transmits to WT 1 504. In a second exemplary embodiments, BS 502 combines the acknowledgement for the WAN uplink data and the acknowledgement for the device to device data into signal 528 which it transmits to WT 1 504, instead of transmitting individual acknowledgement signals 522, 526, e.g., at different times.

Depending upon the embodiment, WT 1 504 receives WAN data acknowledgement signal 522 and device to device data acknowledgement signal 526, or WT 1 504 receives acknowledgement signal 528 communicating both the WAN data acknowledgement to signal 518 and D2D data acknowledgement to signal 520.

Figure 6:
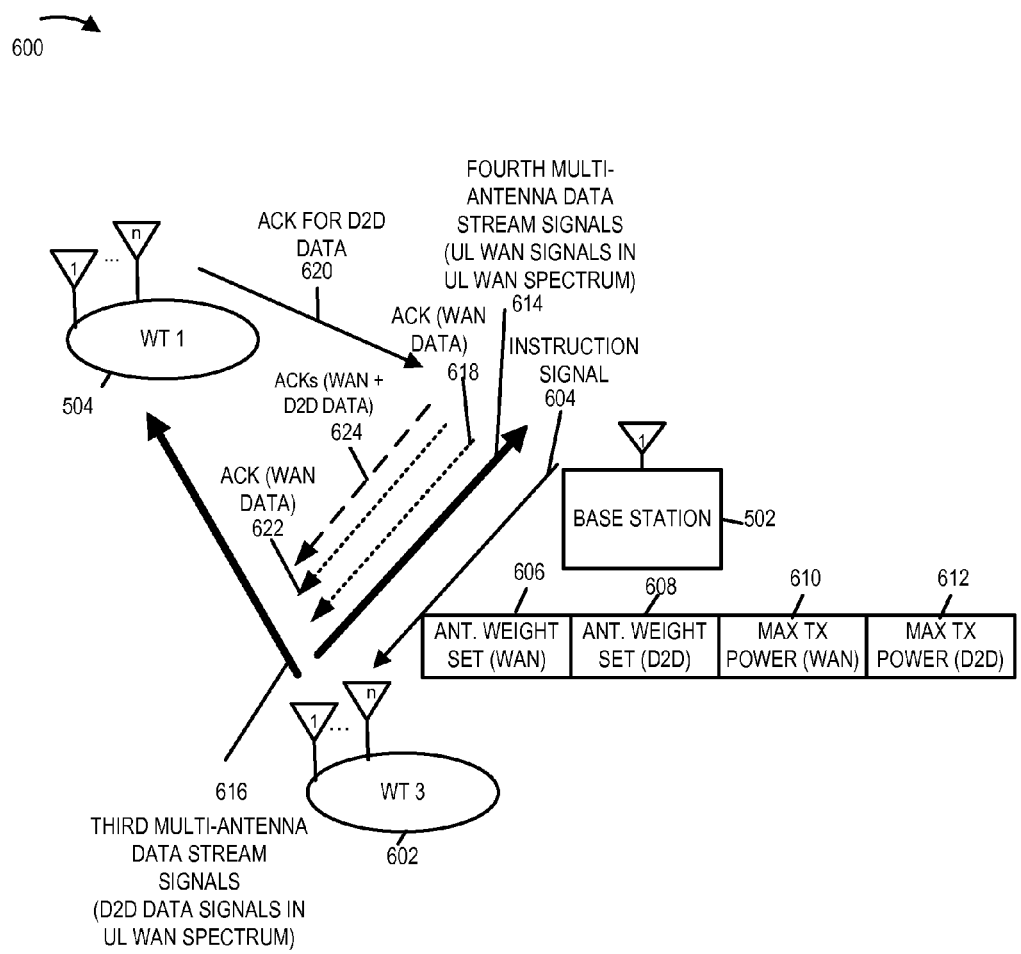
FIG. 6 illustrates an example of operating exemplary wireless communications devices and an exemplary base station in accordance with various exemplary embodiments and is a continuation of the example of FIG. 5.

Drawing 600 of FIG. 6 continues with the example of FIG. 5 illustrates an example of operating exemplary wireless communications devices (WT 1 504, WT 3 602) and the exemplary base station 502 in accordance with various exemplary embodiments. Based on estimated wireless communications channels and estimated interference, base station 502 decides that WT 3 602 can simultaneously: (i) transmit uplink data to the base station 502 on the uplink spectrum in a fourth multi-antenna stream corresponding to a fourth multi-antenna configuration and (ii) transmit device to device data on said uplink spectrum in a third multi-antenna stream corresponding to a third multi-antenna configuration to WT 1 504. BS 502 generates instruction signal 604 instructing WT 3 602 to: simultaneously transmit uplink data to the base station and transmit device to device data which is different from said uplink data to WT 1 504. Instruction signal 604 is communicated in a control channel, e.g., a control channel used to allocate uplink channel resources. Instruction signal 604 includes: antenna weight set information 606 to be used for configuring WT 3 602 with regard the uplink data WAN signaling from WT 3 602 to BS 502; antenna weight set information 608 to be used for configuring WT 3 602 with regard to the device to device data signaling from WT 3 602 to WT 1 504; a maximum transmission power value 610 to be used for controlling WT 3 maximum transmission power with regard to the uplink data signaling to BS 502; and a maximum transmission power value 612 to be used for controlling WT 3 maximum transmission power with regard to device to device data signaling from WT 3 602 to WT 1 504. BS 502 generates transmits generated signal 604 to WT 3 602.

WT 3 602 receives signal 604 and recovers the information communicated in the signal. WT 3 602 recognizes that it is being instructed to simultaneously transmit uplink data to BS 502 on the uplink spectrum and transmit device to device data to WT 1 504 on the uplink spectrum, in accordance with the information, e.g., antenna configuration control information and transmission power control information, communicated in signal 604. WT 3 602 generates and transmits fourth multi-antenna data stream signals 614, which are UL WAN signals in the UL WAN spectrum, in accordance with antenna weight information 606 and max transmission power information 610. WT 3 602 generates and transmits third multi-antenna data stream signals 616, which are device to device data signals in the UL WAN spectrum, in accordance with antenna weight information 608 and max transmission power information 612. Signals 614 and 616 are transmitted simultaneously.

Base station 502 receives signals 614; and WT 1 504 receives signals 616. In a first exemplary embodiment, BS 502 generates and transmits WAN data acknowledgement signal 618, directed to WT 3 602, in response to received signal 614. WT 1 504 generates and transmits device to device data acknowledgement signal 620 directed to BS 502, in response to received signals 616. Continuing with the first exemplary embodiments, BS 502 receives device to device acknowledgement signal 620 and generates device to device data acknowledgement signal 622, which the BS 502 transmits to WT 3 602. In a second exemplary embodiments, BS 502 combines the acknowledgement for the WAN uplink data and the acknowledgement for the device to device data into signal 624 which it transmits to WT 3 602, instead of transmitting individual acknowledgement signals 618, 622, e.g., at different times.

Depending upon the embodiment, WT 3 602 receives WAN data acknowledgement signal 618 and device to device data acknowledgement signal 622, or WT 3 602 receives acknowledgement signal 624 communicating both the WAN data acknowledgement to signal 614 and D2D data acknowledgement to signal 616.

Figure 7:
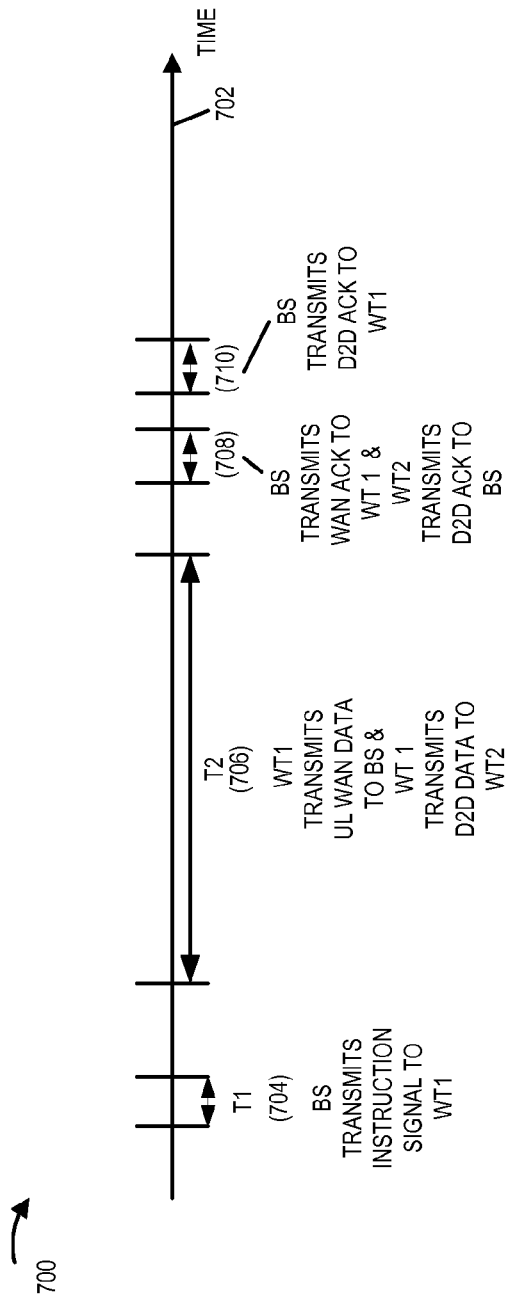
FIG. 7 is a drawing illustrating an exemplary time line which may apply to the signaling of FIG. 5 in accordance with some embodiments.

FIG. 7 is a drawing 700 illustrating an exemplary time line which may apply to the signaling of FIG. 5 in accordance with some embodiments. Horizontal axis 702 represents time. During time T1 704, BS 502 transmits instruction signal 508 to WT 1 504. During time T2 706 WT 1 504 transmits UL WAN data signals 518 and device to device data signals 520 to WT 2 506 in accordance with instruction signal 508. During time T3 708 BS 502 transmits WAN ACK signal 522 to WT 1 and WT 2 transmits device to device ACK signal 524 to BS 502. During time T4 710, BS 502 transmits device to device ACK signal 528 to WT 1 504. In some embodiments, there is a predetermined timing relationship between the transmission of the data signals and the transmission of the corresponding ACKs.

Figure 8:
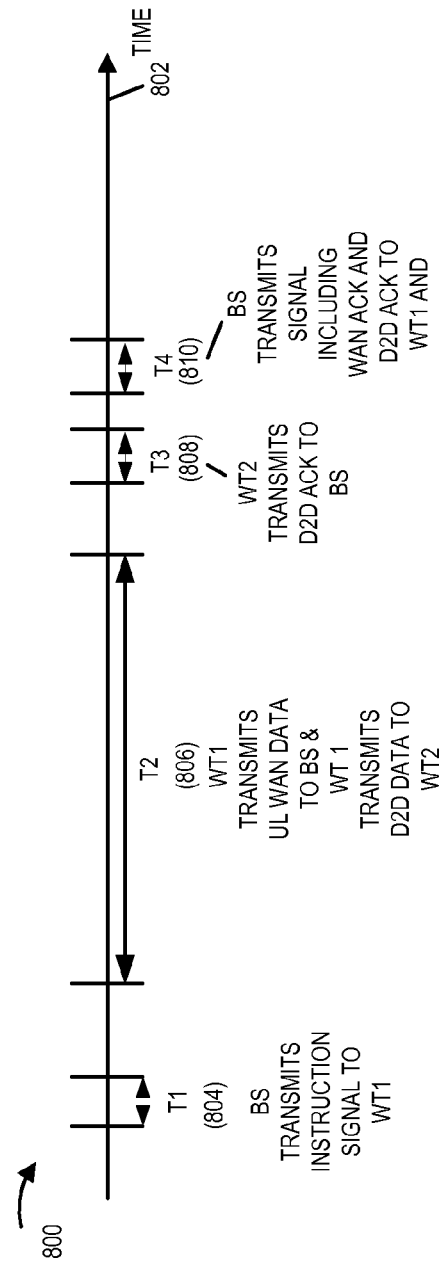
FIG. 8 is a drawing illustrating an exemplary time line which may apply to the signaling of FIG. 5 in accordance with some embodiments.

FIG. 8 is a drawing 800 illustrating an exemplary time line which may apply to the signaling of FIG. 5 in accordance with some embodiments. Horizontal axis 802 represents time. During time T1 804, BS 502 transmits instruction signal 508 to WT 1 504. During time T2 806 WT 1 504 transmits UL WAN data signals 518 and device to device data signals 520 to WT 2 506 in accordance with instruction signal 508. During time T3 808 BS 502 transmits WAN ACK signal 522 to WT 1 504. During time T4 810, BS 502 transmits a signal 528 to WT 1 504 communicating both the WAN data ACK and the device to device data ACK. In some embodiments, there is a predetermined timing relationship between the transmission of the data signals and the transmission of the corresponding ACKs.

Figure 9A:
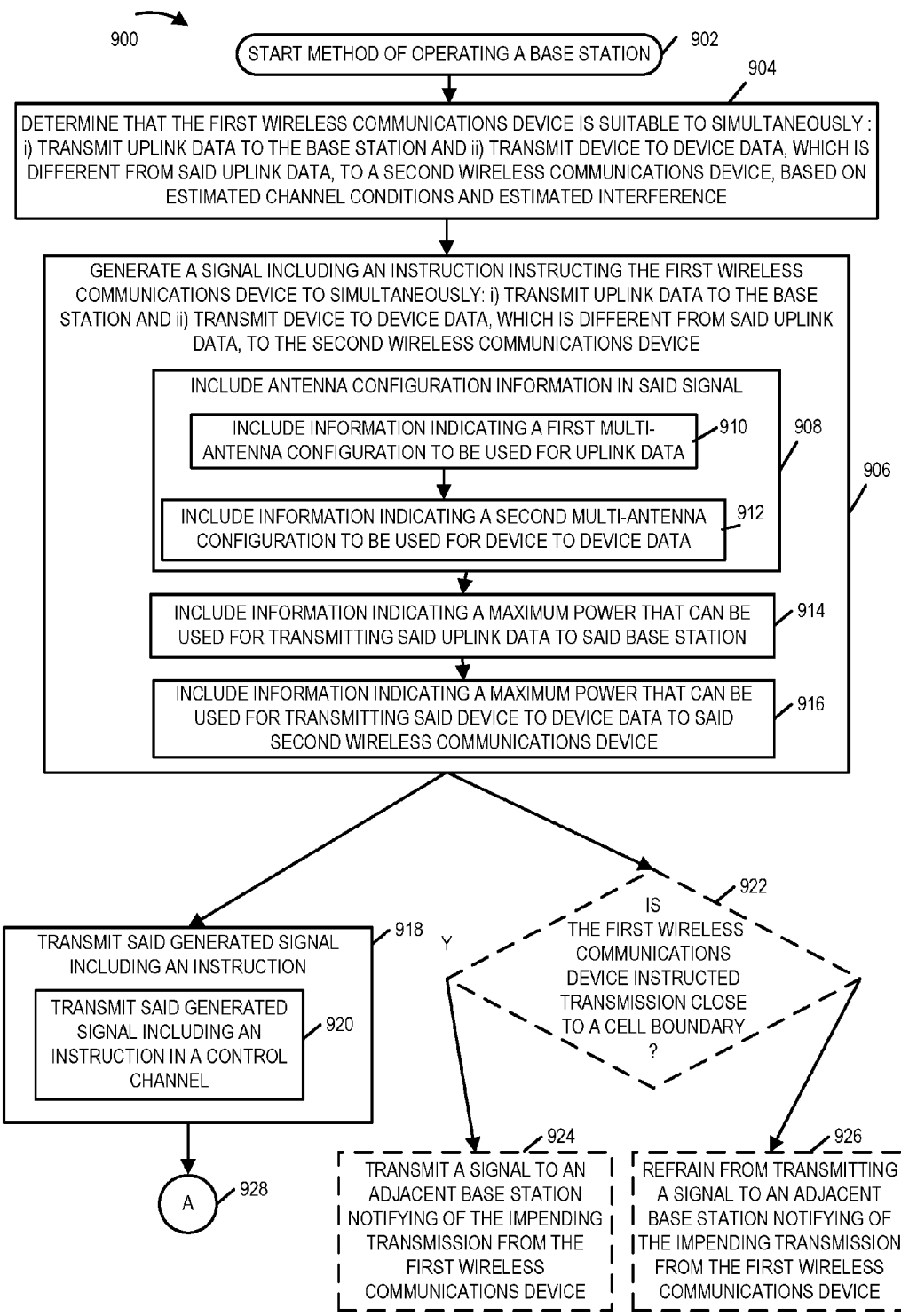
FIG. 9A is a first part of a flowchart of an exemplary method of operating a base station in accordance with an exemplary embodiment.
Figure 9B:
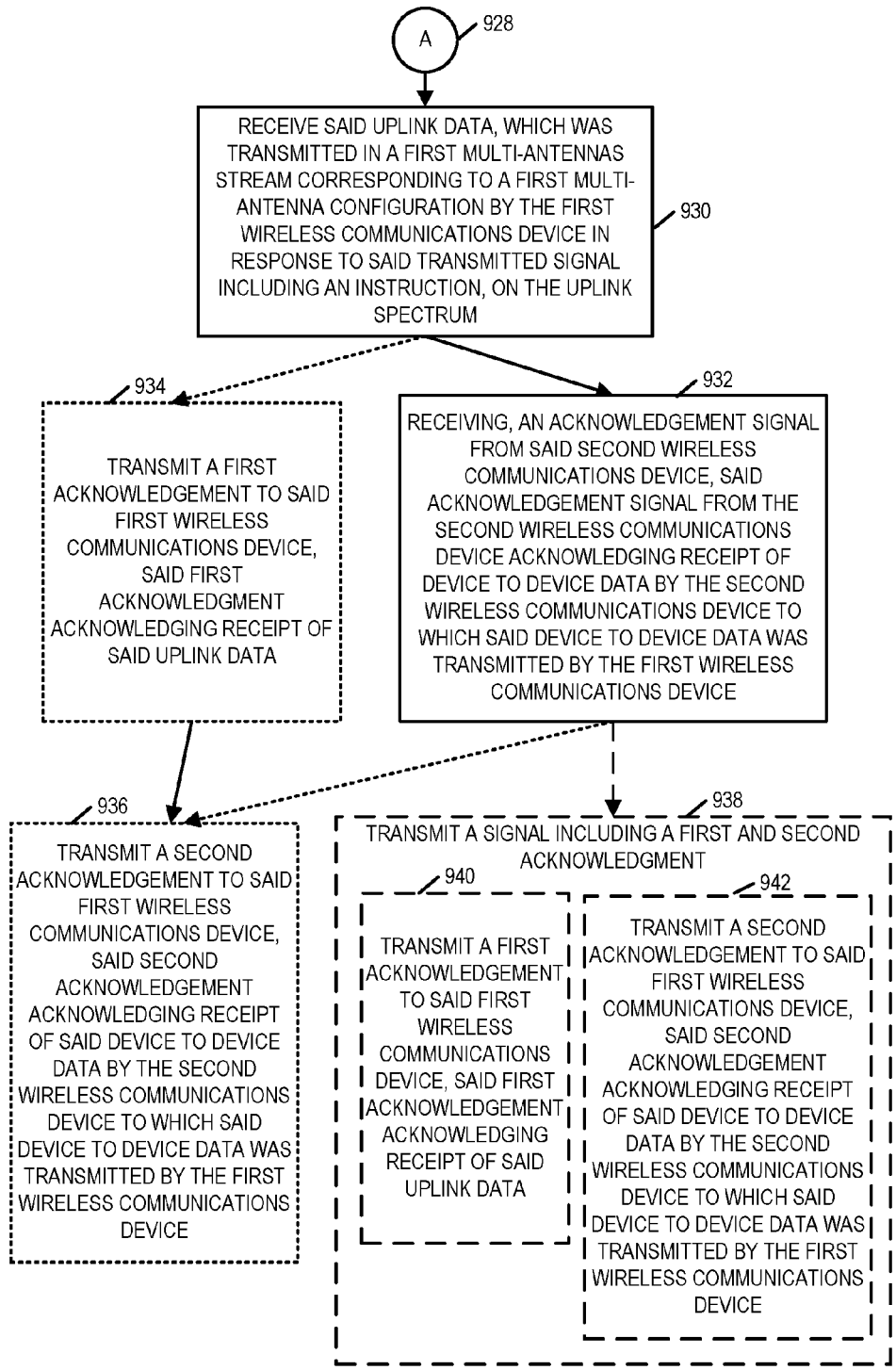
FIG. 9B is a second part of a flowchart of an exemplary method of operating a base station in accordance with an exemplary embodiment.

FIG. 9, comprising the combination of FIG. 9A and FIG. 9B, is a flowchart 900 of an exemplary method of operating a base station, e.g., an infrastructure element such as an eNodeB, in accordance with various exemplary embodiments. Operation of the exemplary method starts in step 902, where the base station is powered on and initialized. Operation proceeds from start step 902 to step 904. In step 904, the base station determines that a first wireless communications device, e.g., a user equipment device such as a mobile wireless terminal, is suitable to simultaneously i) transmit uplink data to the base station and ii) transmit device to device data, which is different from said uplink data, to a second wireless communications device, based on estimated channel conditions and estimated interference. Operation proceeds from step 904 to step 906.

In step 906, the base station generates a signal including an instruction instructing the first wireless communications device to simultaneously i) transmit uplink data to the base station and ii) transmit device to device data, which is different from said uplink data, to the second wireless communications device. Step 906 includes steps 908, 914 and 916. In step 908 the base station includes antenna configuration in said signal. Step 908 includes steps 910 and 912. In step 910 the base station includes information indicating a first multi-antenna configuration to be used for uplink data and in step 912 the base station includes information indicating a second multi-antenna configuration to be used for device to device data. In some embodiments, said information indicating said first multi-antenna configuration is a first set of antenna weights corresponding to said first multi-antenna configuration to be used by said first wireless communications device when transmitting uplink signals using a first set of antennas; and said information indicating a second multi-antenna configuration is a second set of antenna weights corresponding to said second multi-antenna configuration to be used by said first wireless communications device when transmitting device to device data using a second set of antennas, said first and second sets of antenna weights being different.

Operation proceeds from step 908 to step 914. In step 914 the base station includes information indicating a maximum power that can be used for transmitting said uplink data to the base station. Operation proceeds from step 914 to step 916. In step 916 the base station includes information indicating a maximum power that can be used for transmitting said device to device data to said second wireless communications device. Operation proceeds from step 906 to step 918. In some embodiments, operation also proceeds from step 906 to step 922.

In step 922 the base station determines if the first communication device instructed transmission is close to a cell boundary. For example, the first wireless communications may be near a cell boundary. The base station considers if the instructed uplink data transmissions from the first wireless communications device to the base station and/or the instructed device to device transmissions from the first wireless communications device are expected to cause a level of interference to communications within an adjacent cell, e.g., above a predetermined threshold. This can depend upon the location of the first communications device, the location of the second communications device, the instructed antenna configurations, and the instructed maximum transmission power levels. If the base station decides that an instructed first wireless communications device transmission is close to a cell boundary, e.g., and likely to cause interference in the adjacent cell above the predetermined threshold, then operation proceeds from step 922 to step 924. In step 924 the base station transmits, e.g., via the backhaul, a signal to an adjacent base station notifying the adjacent base station of the impending transmission from the first wireless communications device. If the base station decides that the first wireless communication device's instructed transmissions are not close to a cell boundary, then operation proceeds from step 922 to step 926, in which the base station is operated to refrain from transmitting a signal to an adjacent base station notifying of the impending transmission from the first wireless communications device.

Returning to step 918, in step 918 the base station transmits said generated signal including an instruction to the first wireless communications device. Step 918 includes step 920 in which the base station transmits the generated signal including an instruction in a control channel, e.g., a control channel used to allocate uplink channel resources. Operation proceeds from step 918, via connecting node A 928 to step 930.

In step 930 the base station receives, in response to said transmitted signal including an instruction, said uplink data which was transmitted by the first wireless communication device in a first multi-antenna stream corresponding to a first multi-antenna configuration in the uplink spectrum. In some embodiments, the first multi-antenna stream was formed in the channel from transmissions from a first set of multiple antennas. Operation proceeds from step 930 to step 932. In some embodiments, operation also proceeds from step 930 to step 934. In some such embodiments, step 934 is performed in parallel to step 930.

In step 932 the base station receives an acknowledgement signal from said second wireless communications device, said acknowledgement signal from the second wireless communications device acknowledging receipt of device to device data by the second wireless communications device to which said device to device data was transmitted by the first wireless communications device.

Returning to step 934, in step 934 the base station transmits a second acknowledgment to the first wireless communications device, said second acknowledgement acknowledging receipt of said device to device data by the second wireless communications device to which said device to device data was transmitted by the first wireless communications device. In some embodiments, the second acknowledgment signal is transmitted in a downlink transmission resource having a predetermined timing offset from a transmission resource used to transmit the device to device data to the second wireless communications device.

Returning to step 932, in some embodiments, operation proceeds from step 932 to step 936. In other embodiments, operation proceeds from step 932 to step 938. In step 938 the base station transmits a signal including a first and second acknowledgment. In some embodiments, the first and second acknowledgments are jointly coded in the transmitted signal. Step 938, in some embodiments, includes steps 940 and 942. In step 940 the base station transmits a first acknowledgment to said first wireless communications device, said first acknowledgment acknowledging receipt of said uplink data. In step 942 the base station transmits a second acknowledgment to said first wireless communications device, said second acknowledgement acknowledging receipt of said device to device data by the second wireless communications device to which said device to device data was transmitted by the first wireless communications device.

Figure 10:
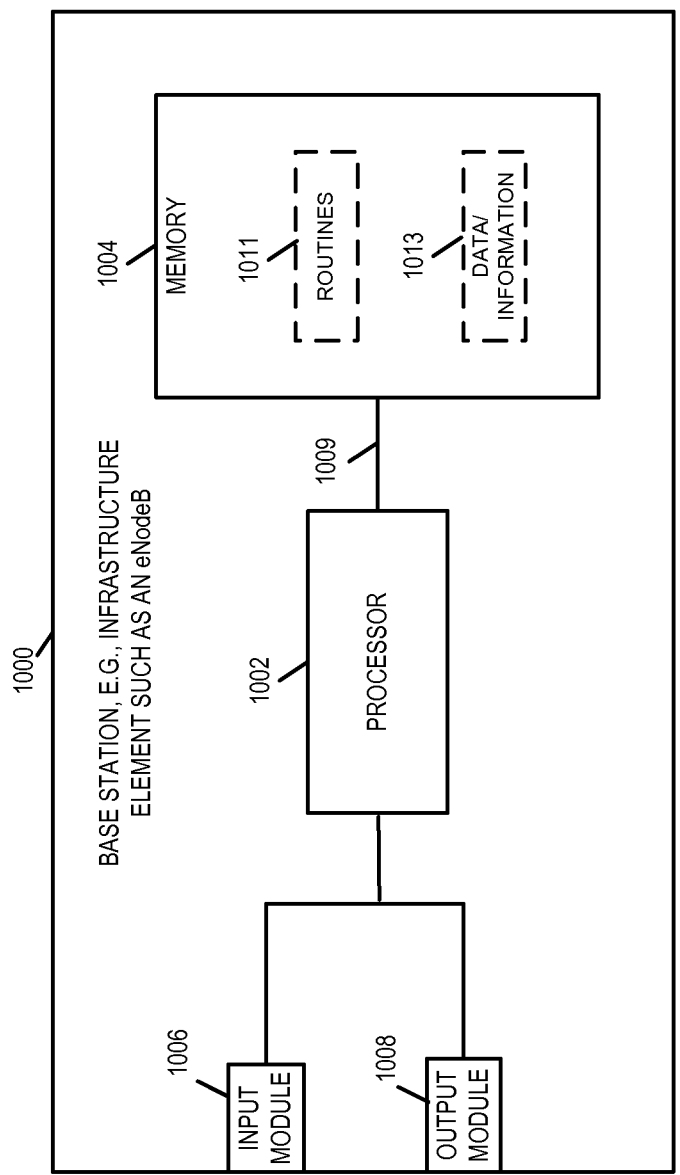
FIG. 10 is a drawing of an exemplary base station in accordance with an exemplary embodiment.

FIG. 10 is a drawing of an exemplary base station 1000, e.g., an infrastructure element such as an eNodeB, in accordance with an exemplary embodiment. Exemplary base station 1000 is, e.g., one of server nodes or base stations (102, ..., 104) of system 100 of FIG. 1 and/or base station 502 of FIGS. 5 and 6. Base station 1000 may, and sometimes does, implement a method in accordance with flowchart 900 of FIG. 9.

Base station 1000 includes a processor 1002 and memory 1004 coupled together via a bus 1009 over which the various elements (1002, 1004) may interchange data and information. Base station 1000 further includes an input module 1006 and an output module 1008 which may be coupled to processor 1002 as shown. However, in some embodiments, the input module 1006 and output module 1008 are located internal to the processor 1002. Input module 1006 can receive input signals. Input module 1006 can, and in some embodiments does, include a wireless receiver and/or a wired or optical input interface for receiving input. Output module 1008 may include, and in some embodiments does include, a wireless transmitter and/or a wired or optical output interface for transmitting output. In some embodiments, memory 1004 includes routines 1011 and data/information 1013.

In various embodiments, processor 1002 is configured to generate a signal including an instruction instructing a first wireless communications device, e.g. a user equipment device such as a mobile wireless terminal, to simultaneously i) transmit uplink data to the base station and ii) transmit device to device data, which is different from said uplink data, to a second wireless communications device; transmit said generated signal including an instruction; and receive, said uplink data, which was transmitted in a first multi-antenna stream corresponding to a first multi-antenna configuration by the first wireless communications device in response to said transmitted signal including an instruction, on the uplink spectrum. In some embodiments, the first multi-antenna stream is formed in the channel from transmission from a first set of multiple antennas.

In various embodiments, processor 1002 is configured to include information indicating a maximum power that can be used for transmitting said device to device data, as part of being configured to generate said signal including an instruction. In some embodiments, processor 1002 is configured to include information indicating a maximum power that can be used for transmitting said uplink data to said base station, as part of being configured to generate said signal including an instruction.

In some embodiments, processor 1002 is configured to transmit said generated signal including an instruction in a control channel, e.g., a channel used to allocate uplink channel resources, as part of being configured to transmitting said generated signal including said instruction.

In various embodiments, processor 1002 is further configured to: transmit a first acknowledgement to said first wireless communications device, said first acknowledgement acknowledging receipt of said uplink data; and transmit a second acknowledgement to said first wireless communications device, said second acknowledgement acknowledging receipt of device to device data by a second wireless communications device to which said device to device data was transmitted by the first wireless communications device. In some such embodiments, said second acknowledgement is transmitted in a downlink transmission resource having a predetermined timing offset from a transmission resource used to transmit said device to device data to the second wireless communications device.

In some embodiments, processor 1002 is further configured to: receive an acknowledgement signal from said second wireless communications device, prior to transmitting said second acknowledgement, said acknowledgement signal from the second wireless communications device acknowledging receipt of device to device data by the second wireless communications device to which said device to device data was transmitted by the first wireless communications device.

In some embodiments, processor 1002 is further configured to include antenna configuration information in said signal, as part of being configured to generate a signal including an instruction. In some such embodiments, said antenna configuration information includes information indicating said first multi-antenna configuration to be used for uplink data and a second multi-antenna configuration to be used for device to device data. In various embodiments, processor 1002 is configured to include information indicating said first multi-antenna configuration to be used for uplink data and information indicating a second multi-antenna configuration to be used for device to device data, as part of being configured to include antenna configuration information in said signal including an instruction. In some embodiments, said information indicating said first multi-antenna configuration is a first set of antenna weights corresponding to said first multi-antenna configuration to be used by said first wireless communications device when transmitting uplink signals using a first set of antennas; and said information indicating a second multi-antenna configuration is a second set of antenna weights corresponding to said second multi-antenna configuration to be used by said first wireless communications device when transmitting device to device data using a second set of antennas, said first and second sets of antenna weights being different.

In some embodiments, processor 1002 is further configured to: determine whether or not the first wireless communications device is suitable to simultaneously i) transmit uplink data to the base station and ii) transmit device to device data which is different from said uplink data to a second wireless communications device, based estimate channel conditions and estimated interference, prior to generating a signal including an instruction. In some embodiments, processor 1002 is configured to: determine whether or not said first wireless communications device instructed transmission is close to a cell boundary; and transmit a signal to an adjacent base station notifying of the impending transmission from the first wireless communications device, when the base station determines that the first wireless communications device instructed transmission is close to a cell boundary.

Figure 11A:
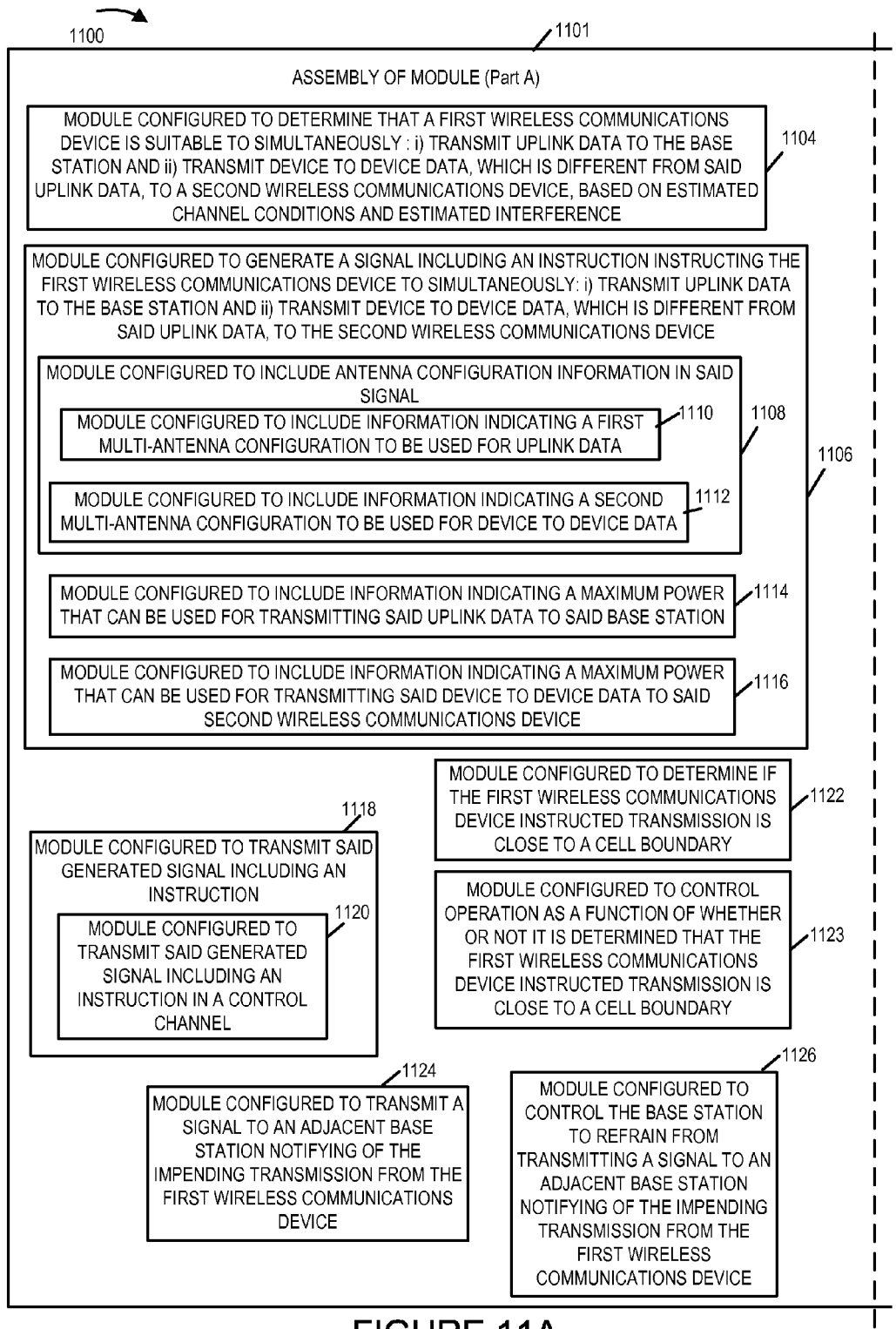
FIG. 11A is a first portion of an assembly of modules which can, and in some embodiments is, used in the exemplary base station illustrated in FIG. 10.
Figures 11, 11B:
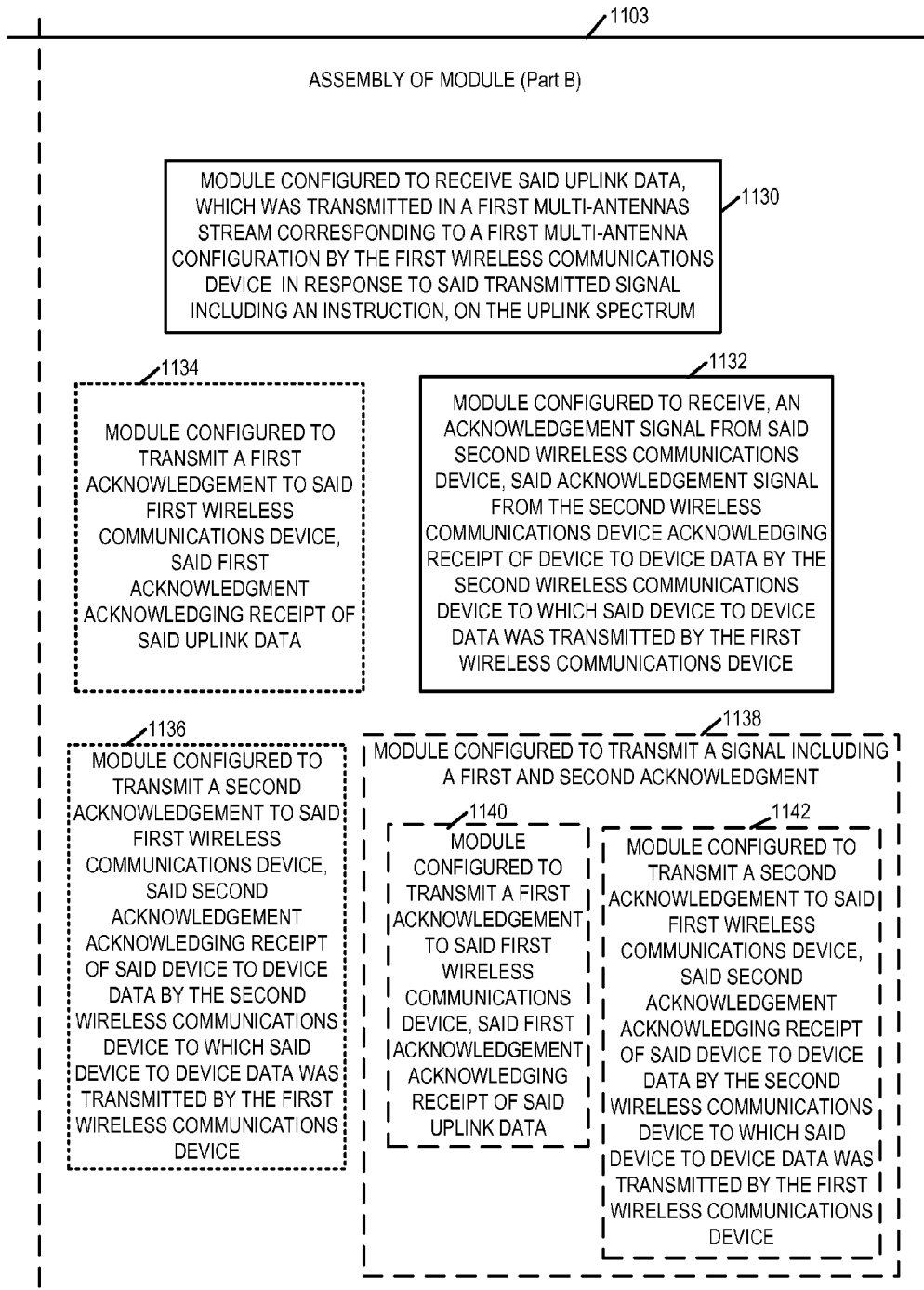
FIG. 11B is a second portion of an assembly of modules which can, and in some embodiments is, used in the exemplary base station illustrated in FIG. 10.

FIG. 11, comprising the combination of FIG. 11A and FIG. 11B, is an assembly of modules 1100, comprising the combination of part A 1101 and part B 1103, which can, and in some embodiments is, used in the exemplary base station 1000 illustrated in FIG. 10. The modules in the assembly 1100 can be implemented in hardware within the processor 1002 of FIG. 10, e.g., as individual circuits. Alternatively, the modules may be implemented in software and stored in the memory 1004 of base station 1000 shown in FIG. 10. In some such embodiments, the assembly of modules 1100 is included in routines 1011 of memory 1004 of device 1000 of FIG. 10. While shown in the FIG. 10 embodiment as a single processor, e.g., computer, it should be appreciated that the processor 1002 may be implemented as one or more processors, e.g., computers. When implemented in software the modules include code, which when executed by the processor, configure the processor, e.g., computer, 1002 to implement the function corresponding to the module. In some embodiments, processor 1002 is configured to implement each of the modules of the assembly of modules 1100. In embodiments where the assembly of modules 1100 is stored in the memory 1004, the memory 1004 is a computer program product comprising a computer readable medium, e.g., a non-transitory computer readable medium, comprising code, e.g., individual code for each module, for causing at least one computer, e.g., processor 1002, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 11 control and/or configure the base station 1000 or elements therein such as the processor 1002, to perform the functions of the corresponding steps illustrated and/or described in the method of flowchart 900 of FIG. 9.

FIG. 11 is an assembly of modules 1100 in accordance with various embodiments. Assembly of modules 1100 includes a module 1104 configured to determine that a first wireless communications device is suitable to simultaneously: i) transmit uplink data to the base station and ii) transmit device to device data, which is different from said uplink data, to a second wireless communications device, based on estimated channel conditions and estimated interference, and a module 1106 configured to generate a signal including an instruction instructing the first wireless communications device to simultaneously: i) transmit uplink data to the base station and ii) transmit device to device data, which is different from said uplink data, to a second wireless communications device. Module 1106 includes a module 1108 configured to include antenna configuration information in said signal, and a module 1114 configured to include information indicating a maximum power that can be used for transmitting said uplink data to said base station and a module 1116 configured to include information indicating a maximum power that can be used for transmitting said device to device data to said second wireless communications device. Module 1108 further includes a module 1110 configured to including information indicating a first multi-antenna configuration to be used for uplink data and a module 1112 configured to include information indicating a second multi-antenna configuration to be used for device to device data. In some embodiments, said information indicating said first multi-antenna configuration is a first set of antenna weights corresponding to said first multi-antenna configuration to be used by said first wireless communications device when transmitting uplink signals using a first set of antennas; and said information indicating a second multi-antenna configuration is a second set of antenna weights corresponding to said second multi-antenna configuration to be used by said first wireless communications device when transmitting device to device data using a second set of antennas, said first and second sets of antenna weights being different.

Assembly of modules 1100 further includes a module 1118 configured to transmit said generated signal including an instruction. Module 1118 includes a module 1120 configured to transmit said generated signal including an instruction in a control channel. Assembly of modules 1100 further includes a module 1122 configured to determine if the first wireless communications device instructed transmission is close to a cell boundary, a module 1123 configured to control operation as a function of whether or not it is determined that the first wireless communication device instructed transmission is close to a cell boundary, a module 1124 configured to transmit a signal to an adjacent base station notifying of the impending transmission form the first wireless communications device and a module 1126 configured to control the base station to refrain from transmitting a signal to an adjacent base station notifying the adjacent base station of the impending transmission from the first wireless communications device.

Assembly of module 1100 further includes a module 1130 configured to receive said uplink data on the uplink spectrum which was transmitted in a first multi-antenna stream corresponding to a first multi-antenna configuration by the first wireless communications device in response to said transmitted signal including an instruction, and a module 1132 configured to receive an acknowledgment signal from said second wireless communications device acknowledging receipt of device to device data by the second wireless communications device to which said device to device data was transmitted by the first wireless communications device. In some embodiments, assembly of modules 1100 includes a module 1134 configured to transmit a first acknowledgment to said first wireless communications device, said first acknowledgment acknowledging receipt of said uplink data, and a module 1136 configured to transmit a second acknowledgment to said first wireless communications device, said second acknowledgment acknowledging receipt of said device to device data by the second wireless communications device to which said device to device data was transmitted by the first wireless communications device. In some embodiments, the second acknowledgment is transmitted in a downlink transmission resource having a predetermined timing offset from a transmission resource used to transmit said device to device data to the second wireless communications device. In some embodiments, assembly of modules 1100 includes a module 1138 configured to transmit a signal including a first and second acknowledgment. In some such embodiments, module 1138 includes a module 1140 configured to transmit a first acknowledgment to said first wireless communications device, said first acknowledgment acknowledging receipt of said uplink data, and a module 1142 configured to transmit a second acknowledgment to said first wireless communications device, said second acknowledgment acknowledging receipt of said device to device data by the second wireless communications device to which said device to device data was transmitted by the first wireless communications device.

Figure 12:
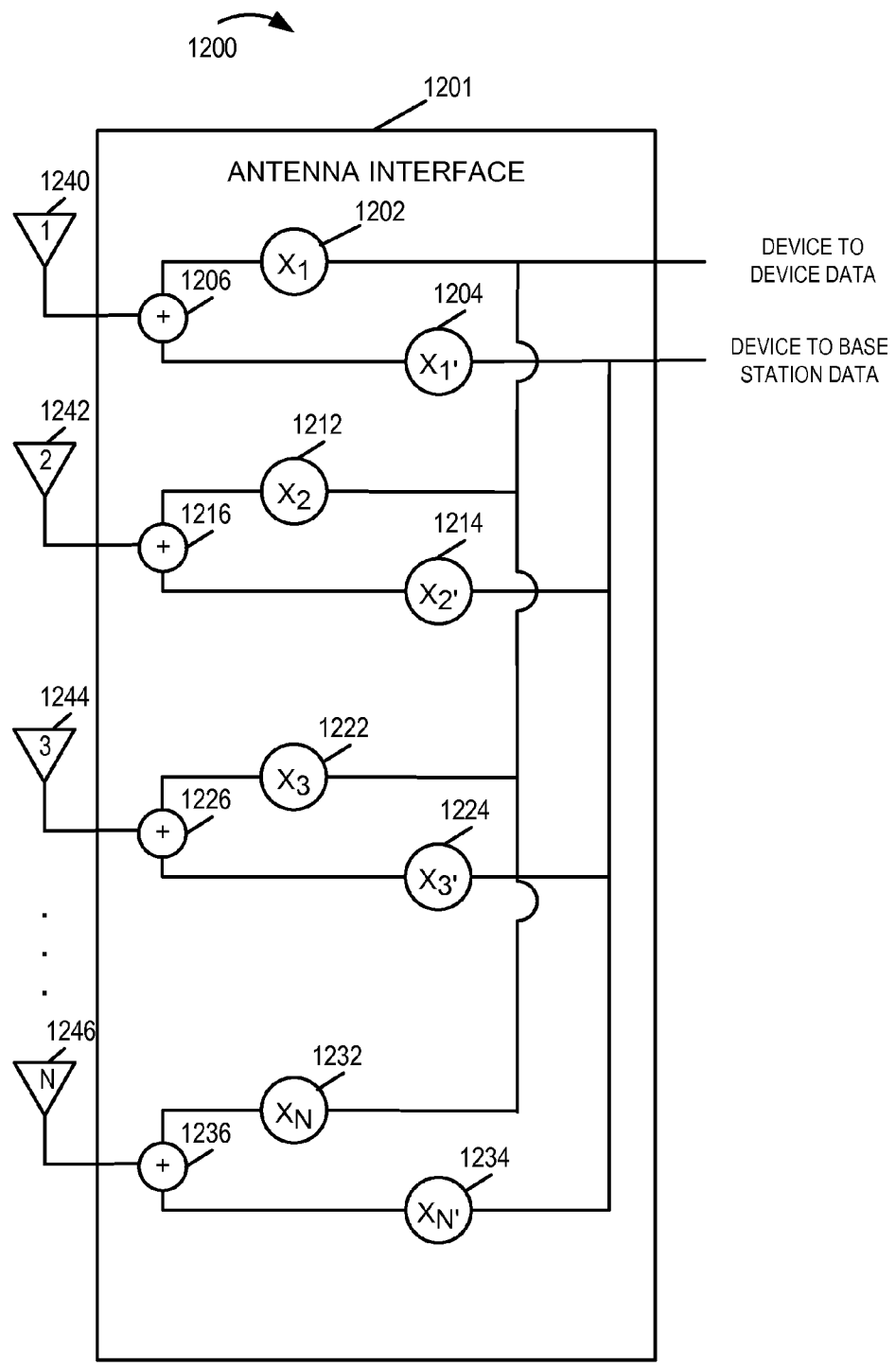
FIG. 12 illustrates an exemplary apparatus, including an antenna interface and antennas, which maybe used as the antennas and antenna interface of a wireless communications device, e.g., wireless terminal of FIG. 3 or any one of the wireless terminals shown in FIG. 1.

FIG. 12 illustrates an exemplary apparatus 1200, including an antenna interface 1201 and N antennas 1240, 1242, 1244, 1246, which may be used as the antennas and antenna interface of a wireless communications device, e.g., wireless terminal of FIG. 3 or any one of the wireless terminals shown in FIG. 1.

In the FIG. 12 example, the antenna interface 1201 includes a device to device data input which receives data to be transmitted as a part of a device to device data stream. In the FIG. 12 example, device to device and device to base station transmission can, and in some embodiments do occur, on the same time and frequency communications resources but with different antenna configurations being used to control or minimize the interference between the simultaneous device to base station and device to device transmissions. The device to base station transmissions may be infrastructure, e.g., cellular network, transmissions, while the device to device signals may be direct peer to peer data communications. The wireless terminal in which the apparatus 1200 is used may be a user equipment device such as a handheld mobile wireless terminal or other end user device.

The device to device data is supplied to each of a plurality of multipliers 1202, 1212, 1222, 1232, which are coupled by summers 1206, 1216, 1226, 1236 to first through Nth antennas 1240, 1242, 1244, 1246, respectively. The multipliers 1202, 1212, 1222, 1232 are gain elements which apply a gain to the received signal, e.g., the device to device data signal. The identifiers ($X_1$, $X_2$, $X_3$, $X_N$) in each of the multipliers represent a gain or weight applied by the multiplier to the received signal, e.g., device to device data signal. A gain of 0 means that a zero gain is applied and the device to device data will not be output. A gain of less than one indicates that the device to device data signal will be attenuated while a gain of one indicates the device to device data is to be transmitted at full power. While in some embodiments gains between 0 and 1 are used, in other embodiments other gains may be used and the gain applied may be between 0 and some value greater than one. The gains applied by the multiplier's 1202, 1212, 1222, 1232 can be indicated as weights which are loaded into the gain elements and used to control the gain applied by each of the particular gain elements. A base station may supply, indicate or otherwise specify the set of weights which are used to control the individual gain elements, e.g., one for each of the N antennas in the system. For example, if a base station specifies in a system where N is 4, a set of weights having the values [0, 1, 0.5, 0] to be used for device to device data, multiplier 1202 would apply a gain of 0, multiplier 1212 would apply a gain of 1, multiplier 1222 would apply a gain of 0.5 and multiplier 1232 would apply a gain of 0 to the device to device data. As a result, antennas 1 and N would not be used to transmit the device to device data while antenna 2 1242 would transmit the device to device data at full power and antenna 3 would transmit the device to device data at half the power level of the device to device data signal transmitted by antenna 1242. The combination of the signal transmissions from the N antennas forms a multi-antenna device to device data stream which may be received directly by the device to which the data stream is directed. By controlling the antenna weights, a base station and/or wireless terminal can steer or focus the antenna beam formed by the multiple antennas transmitting the device to device data to control interference in a predictable manner, e.g., to minimize or control interference to device to base station transmissions or other base stations while allowing direct device to device data transmissions to occur simultaneously with the device to base station transmissions.

The device to base station transmissions are handled the same or similar manner in the apparatus 1200 but with a different set of control parameters, e.g., weights, being used to control which antennas are used for device to base station transmission and the contribution of each antenna to the overall multi-antenna device to base station data stream.

For example, in the apparatus 1200 the device to base station data is supplied to each of a plurality of multipliers 1204, 1214, 1224, 1234, which are coupled by the summers 1206, 1216, 1226, 1236 to the first through Nth antennas 1240, 1242, 1244, 1246, respectively. The multipliers 1204, 1214, 1224, 1234 are gain elements which apply a gain to the received signal, e.g., the device to base station data signal. The identifiers ($X_{1'}$, $X_{2'}$, $X_{3'}$, $X_{N'}$) in each of the multipliers represents a gain or weight applied by the multiplier to the received signal, e.g., device to device data signal. A gain of 0 means that a zero gain is applied and the device to device data will not be output. A gain of less than one indicates that the device to device data signal will be attenuated while a gain of one indicates the device to device data is to be transmitted at full power. While in some embodiments gains between 0 and 1 are used, in other embodiments other gains may be used and the gain applied may be between 0 and some value greater than one. The gains applied by the multiplier's 1204, 1214, 1224, 1234 can be indicated as weights which are loaded into the gain elements and used to control the gain applied by each of the particular gain elements. A base station may supply, indicate or otherwise specify the set of weights which are used to control the individual gain elements, e.g., one for each of the N antennas in the system. For example, if a base station specifies in a system where N is 4, a set of weights having the values [1, 0, 0.5, 1] to be used for device to base station data, multiplier 1204 would apply a gain of 1, multiplier 1214 would apply a gain of 0, multiplier 1224 would apply a gain of 0.5 and multiplier 1234 would apply a gain of 1 to the device to base station data. As a result, antennas 1, 3 and N would be used to transmit the device to device data while antenna 2 1242 would not be used transmit the device to base station data. Antennas 1240 and 1246 would transmit the device to base station data at full power and antenna 3 would transmit the device to base station data at half the power level of the device to base station data signal transmitted by antenna 1240 and 1246. The combination of the signal transmissions from the N antennas forms a multi-antenna device to base station data stream which may be received by the base station to which the data stream is directed. By controlling the antenna weights, a base station and/or wireless terminal can steer or focus the antenna beam formed by the multiple antennas transmitting the device to base station data to control interference in a predictable manner, e.g., to minimize or control interference to device to device transmissions while allowing device to base station device data transmissions to occur simultaneously with the device to device transmissions.

In the event of an unsuccessful device to base station or device to device data transmission where the transmissions are performed simultaneously, retransmission may be implemented without the use of simultaneous transmissions. For example, if a device to base station transmission fails, e.g., an acknowledgement is not received or a NAK (negative acknowledgement) is received with regard to the device to base station transmission, retransmission of the device to base station data may, and in some embodiments is, repeated but without the simultaneous transmission of device to device data with the device to base station data transmission. Thus, in the case of a retransmission of device to base station data, interference from a simultaneous device to device transmission is avoided increasing the chance of a successful transmission.

If a device to device transmission fails, e.g., an acknowledgement is not received or a NAK (negative acknowledgement) is received with regard to the device to device transmission, retransmission of the device to device data may, and in some embodiments is, repeated but without the simultaneous transmission of device to base station data. Thus, in the case of a retransmission of device to device data, interference from a simultaneous device to base station transmission is avoided increasing the chance of a successful transmission.

In the case of a failure of both a device to base station and a device to device transmission the retransmissions occur serially in some embodiments with each transmission occurring without interference from the retransmission of the other.

Various aspects and/or features of some, but not necessarily all, embodiments, will be discussed further below. In various embodiments, device to device communication on the uplink using multiple antennas is enabled.

Figure 13:
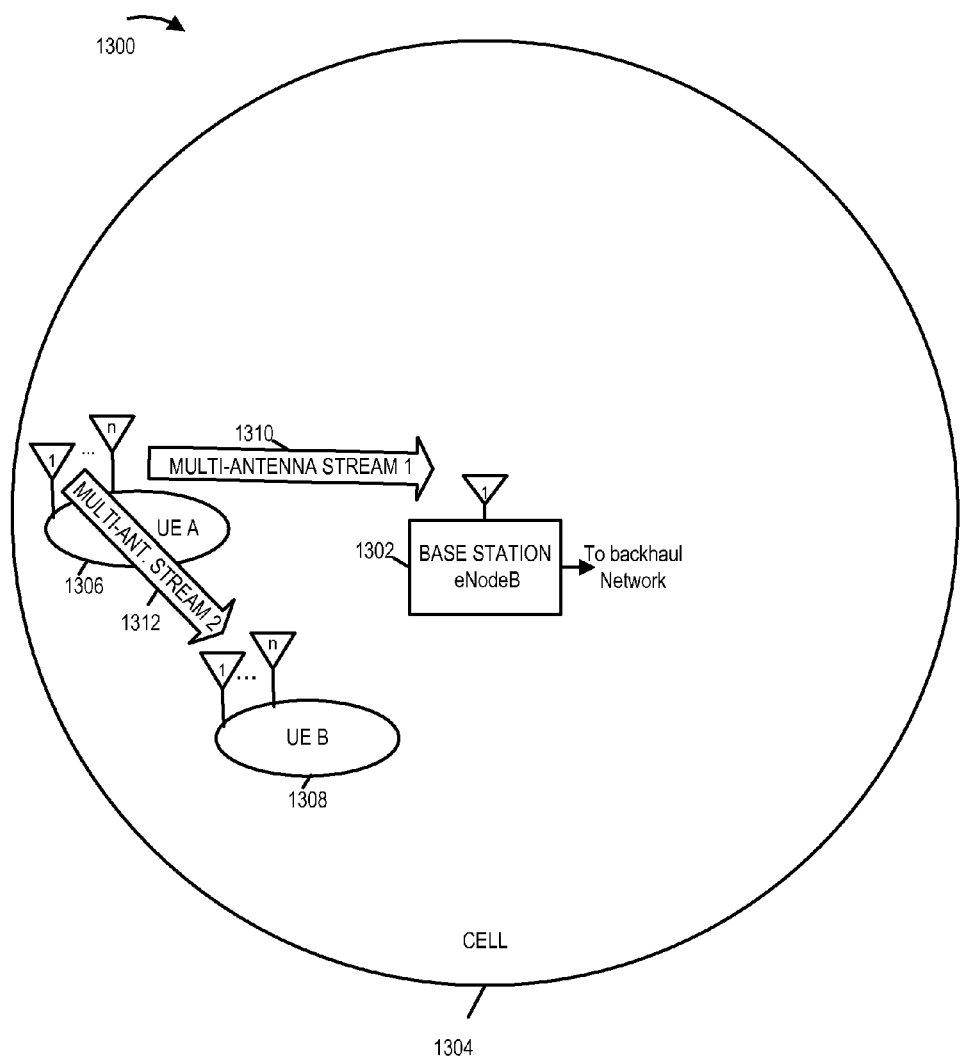
FIG. 13 is a drawing of an exemplary communications system in which a first UE device transmits a first multi-antenna stream to an eNodeB on the uplink and simultaneously transmits a second multi-antenna stream to a second UE device on the uplink.

LTE Release 10 allows a user equipment (UE) to transmit multiple streams on uplink using multiple antennas. For example a UE A can transmit two streams (or antenna ports) using multiple antennas to the base station. In accordance with a feature of some embodiments UE A can, and sometimes does, transmit one multi-antenna stream on uplink to an eNodeB (base station) and use another multi-antenna stream to transmit directly to another device, e.g., UE B. This is illustrated in drawing 1300 of FIG. 13 in which UE device A 1306 transmits to both (i) UE B 1308 and (ii) eNode B 1302, which is a base station with corresponding cell 1304, at the same time using multiple antennas.

Typically, such transmission will be scheduled by the eNodeB 1302 rather than UE A 1306 deciding on its own to transmit simultaneously to the eNodeB 1302 and UE B 1308. To enable this approach, it is advantageous if eNodeB 1302 knows the channel gain between both: the eNodeB (base station) 1302 and UE A 1306, and (ii) between UE A 1306 and UE B 1308. In some embodiments, eNodeB 1302 determines the channel gain between itself 1302 and UE A 1306 using the LTE SRS transmitted by UE A 1306. To learn about the channel gain between UE A 1306 and UE B 1308, in some embodiments, eNodeB 1302 uses the reference signals (SRS) transmitted by UE A 1306. In some embodiments, eNodeB 1302 tells UE B 1308 to listen to the SRS transmitted by UE A 1306. In some such embodiments, UE B 1308 then sends its received signal strength measurement to the eNodeB 1302. Now since eNodeB 1302 knows the power at which UE A 1306 transmitted its reference signal, eNode B 1302 can, and in some embodiments does, estimate the channel between UE A 1306 and UE B 1308. In some such embodiments, eNodeB 1302, decides whether uplink and device to device communication can occur on separate multi-antenna streams. In some such embodiments eNodeB 1302 figures out, e.g., determines, the rank of the channel gain matrix, and bases it decision on the rank determination. If the decision is that it is possible to have simultaneous streams then, in some embodiments, eNodeB 1302 will schedule the transmission in PDCCH.

The Ack for device to device communication can be, and in some embodiments is, routed over the LTE-WAN. The Ack can follow a WAN downlink/uplink time line and the dedicated resources used for Ack. For example in LTE the Ack can first go over PUCCH and then be forwarded over the PHICH channel.

One issue with scheduling such device to device communication is that this can cause significant interference to one or more neighboring eNodeBs. For example if UE B 1308 was near the edge of the cell 1304 then the transmission from UE A 1306 can significantly interfere with either an ongoing uplink or device to device transmission in a neighboring cell. These issues can be resolved with conventional intercell interference messaging between eNodeB and power control on the device to device transmission. For example when eNodeB 1302 schedules a simultaneous transmission on WAN uplink and device to device transmission from UE A 1306 on a resource, it can either convey a power cap to UE A 1306 for device to device transmission and/or inform neighboring eNodeBs that they should expect high interference on the scheduled resource and act accordingly.

In various embodiments a wireless communications device or base station in system 100 of FIG. 1, and/or wireless communication device 300 of FIG. 3, and/or a base station of 900 of FIG. 9 and/or a wireless communications device or base station of FIG. 5 and/or FIG. 6, and/or one of the wireless communications devices or base stations of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating mobile nodes, access points such as base stations, network nodes, and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless communications device, comprising:
   receiving a signal including an instruction instructing the first wireless communications device to simultaneously i) transmit uplink data to a base station and ii) transmit device to device data which is different from said uplink data to a second wireless communications device, wherein said signal further includes information indicating a maximum power that can be used for transmitting said device to device data and information indicating a maximum power that can be used for transmitting said uplink data to said base station, and wherein said signal is received from said base station in a control channel;
   transmitting, in accordance with said instruction, said uplink data on an uplink spectrum in a first multi-antenna stream corresponding to a first multi-antenna configuration;
   transmitting, simultaneously with said uplink data, in accordance with said instruction, said device to device data on the uplink spectrum in a second multi-antenna stream corresponding to a second multi-antenna configuration, said uplink data being different from said device to device;
   receiving a first acknowledgement from said base station, said first acknowledgement acknowledging receipt of said uplink data; and
   receiving a second acknowledgement from said base station, said second acknowledgement acknowledging receipt of said device to device data by said second wireless communications device to which said device to device data was transmitted, wherein the second acknowledgement is received in a downlink transmission resource with a predetermined timing offset from a transmission resource used by the first wireless communications device to transmit the device to device data.

2. A first wireless communications device, comprising:
- means for receiving a signal including an instruction instructing the first wireless communications device to simultaneously i) transmit uplink data to a base station and ii) transmit device to device data which is different from said uplink data to a second wireless communications device, wherein said signal further includes information indicating a maximum power that can be used for transmitting said device to device data and information indicating a maximum power that can be used for transmitting said uplink data to said base station, and wherein said signal is received from said base station in a control channel;
- means for transmitting, in accordance with said instruction, said uplink data on an uplink spectrum in a first multi-antenna stream corresponding to a first multi-antenna configuration;
- means for transmitting, simultaneously with said uplink data, in accordance with said instruction, said device to device data on the uplink spectrum in a second multi-antenna stream corresponding to a second multi-antenna configuration, said uplink data being different from said device to device data;
- means for receiving a first acknowledgement from said base station, said first acknowledgement acknowledging receipt of said uplink data; and
- means for receiving a second acknowledgement from said base station, said second acknowledgement acknowledging receipt of said device to device data by said second wireless communications device to which said device to device data was transmitted, wherein the second acknowledgement is received in a downlink transmission resource with a predetermined timing offset from a transmission resource used by the first wireless communications device to transmit the device to device data.

3. A non-transitory computer-readable medium storing computer executable code, comprising code to:
- receive a signal including an instruction instructing a first wireless communications device to simultaneously i) transmit uplink data to a base station and ii) transmit device to device data which is different from said uplink data to a second wireless communications device, wherein said signal further includes information indicating a maximum power that can be used for transmitting said device to device data and information indicating a maximum power that can be used for transmitting said uplink data to said base station, and wherein said signal is received from said base station in a control channel;
- transmit, in accordance with said instruction, said uplink data on the uplink spectrum in a first multi-antenna stream corresponding to a first multi-antenna configuration;
- transmit, simultaneously with said uplink data, in accordance with said instruction, said device to device data on an uplink spectrum in a second multi-antenna stream corresponding to a second multi-antenna configuration, said uplink data being different from said device to device data;
- receive a first acknowledgement from said base station, said first acknowledgement acknowledging receipt of said uplink data; and
- receive a second acknowledgement from said base station, said second acknowledgement acknowledging receipt of said device to device data by said second wireless communications device to which said device to device data was transmitted, wherein the second acknowledgement is received in a downlink transmission resource with a predetermined timing offset from a transmission resource used by the first wireless communications device to transmit the device to device data.

4. A first wireless communications device comprising:
- a memory; and
- at least one processor coupled to the memory and configured to:
  - receive a signal including an instruction instructing the first wireless communications device to simultaneously i) transmit uplink data to a base station and ii) transmit device to device data which is different from said uplink data to a second wireless communications device, wherein said signal further includes information indicating a maximum power that can be used for transmitting said device to device data and information indicating a maximum power that can be used for transmitting said uplink data to said base station, and wherein said signal is received from said base station in a control channel;
  - transmit, in accordance with said instruction, said uplink data on an uplink spectrum in a first multi-antenna stream corresponding to a first multi-antenna configuration;
  - transmit, simultaneously with said uplink data, in accordance with said instruction, said device to device data on the uplink spectrum in a second multi-antenna stream corresponding to a second multi-antenna configuration, said uplink data being different from said device to device;
  - receive a first acknowledgement from said base station, said first acknowledgement acknowledging receipt of said uplink data; and
  - receive a second acknowledgement from said base station, said second acknowledgement acknowledging receipt of said device to device data by said second wireless communications device to which said device to device data was transmitted, wherein the second acknowledgement is received in a downlink transmission resource with a predetermined timing offset from a transmission resource used by the first wireless communications device to transmit the device to device data.

* * * * *